United States Patent
Nakahara et al.

(10) Patent No.: US 7,771,496 B1
(45) Date of Patent: Aug. 10, 2010

(54) REDUCTION OF IMPURITIES IN BATTERY ELECTROLYTE

(75) Inventors: Hiroshi Nakahara, Santa Clarita, CA (US); Sang Young Yoon, Saugus, CA (US)

(73) Assignee: Quallion LLC, Sylmar, CA (US)

( * ) Notice: Subject to any disclaimer, the term of this patent is extended or adjusted under 35 U.S.C. 154(b) by 1585 days.

(21) Appl. No.: 11/053,338

(22) Filed: Feb. 8, 2005

(51) Int. Cl.
*H01M 6/00* (2006.01)

(52) U.S. Cl. ............ 29/623.1; 29/623.5; 429/188; 429/306; 429/307; 429/322; 429/330; 429/338

(58) Field of Classification Search .......... 29/623.1, 29/623.5; 429/188, 306, 307, 322, 330, 338
See application file for complete search history.

(56) References Cited

U.S. PATENT DOCUMENTS 5,648,011 A * 7/1997 Blonsky ............ 429/189

6,503,661 B1 * 1/2003 Park et al. ............ 429/306

FOREIGN PATENT DOCUMENTS

DE 10122811 * 11/2002
JP 61-284062 * 12/1986

* cited by examiner

*Primary Examiner*—Laura S Weiner
(74) *Attorney, Agent, or Firm*—Gavrilovich Dodd & Lindsey, LLP

(57) ABSTRACT

A method of a reducing impurities in an electrolyte includes contacting one or more components of an electrolyte with a zeolite. The method also includes activating one or more anode and one or more cathodes with the electrolyte. Contacting the one or more components with the zeolite can include contacting the electrolyte with the zeolite. In some instances, the method includes preparing the electrolyte after contacting the one or more components of the electrolyte with the zeolite.

37 Claims, 3 Drawing Sheets

US 7,771,496 B1

REDUCTION OF IMPURITIES IN BATTERY ELECTROLYTE

STATEMENT REGARDING FEDERALLY SPONSORED RESEARCH OR DEVELOPMENT

This invention was made with United States Government support under NIST ATP Award No. 70NANB043022 awarded by the National Institute of Standards and Technology (NIST). The United States Government has certain rights in this invention pursuant to NIST ATP Award No. 70NANB043022 and pursuant to Contract No. W-31-109-ENG-38 between the United States Government and the University of Chicago representing Argonne National Laboratory, and NIST 144 LM01, Subcontract No. AGT DTD Sep. 9, 2002.

FIELD

The present invention relates to electrochemical devices, and more particularly to the use of zeolites in conjunction with electrochemical device electrolytes.

BACKGROUND

The increased demand for lithium batteries has resulted in research and development to improve the safety and performance of these batteries. The organic carbonate solvents employed in the electrolytes of many batteries are associated with high degrees of volatility, flammability, and chemical reactivity. A variety of electrolytes that include siloxane solvents have been developed to address these issues. Secondary batteries with siloxane solvents have shown poor cycling performance when used in secondary batteries. As a result, there is a need for a secondary battery that can take advantage of a siloxane solvent.

SUMMARY

A method of preparing a battery is disclosed. The method includes contacting one or more components of an electrolyte with a zeolite. The method also includes activating one or more anode and one or more cathodes with the electrolyte. Contacting the one or more components with the zeolite can include contacting the electrolyte with the zeolite. In some instances, the method includes preparing the electrolyte after contacting the one or more components of the electrolyte with the zeolite. The one or more components can include salts, organic solvents, siloxanes, silanes, additives, network polymers and/or solid polymers.

A battery is also disclosed. The battery includes an electrolyte activating one or more anodes and one or more cathodes. The electrolyte includes a salt in a solvent. The solvent is more than 50 wt % of one or more components selected from the group consisting of silane, disiloxanes, trisiloxane and tetrasiloxane and is less than 50 ppm water.

Another embodiment of a battery is disclosed. The battery includes an electrolyte activating one or more anodes and one or more cathodes. A zeolite is in contact with the electrolyte. In some instances, the one or more of the anodes include a zeolite; and/or one or more of the cathodes include a zeolite; and/or the separator includes a zeolite; and/or a zeolite is present in the electrolyte.

DESCRIPTION

Figure 1:
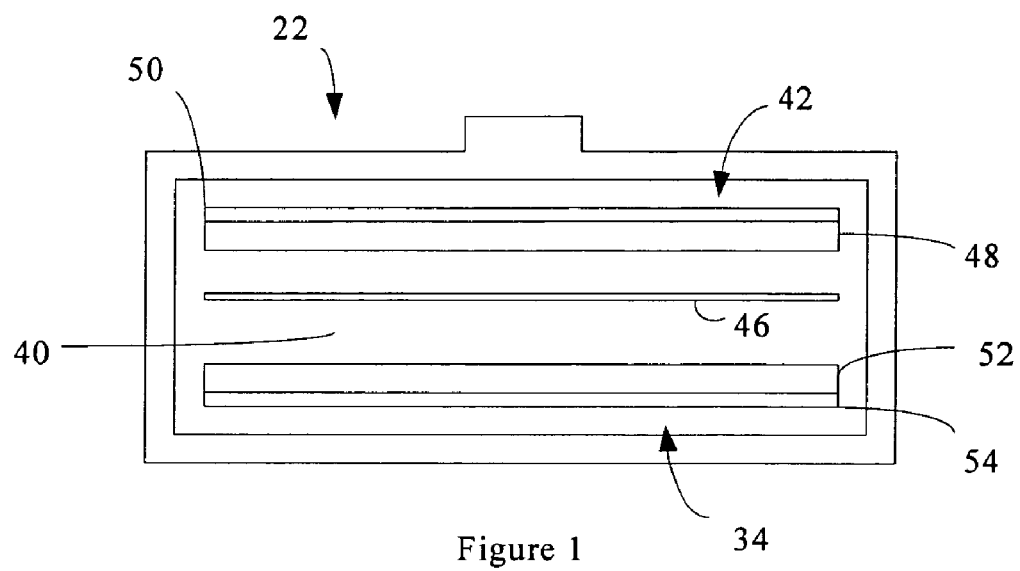
FIG. 1 is a schematic view of a battery.
Figure 2:
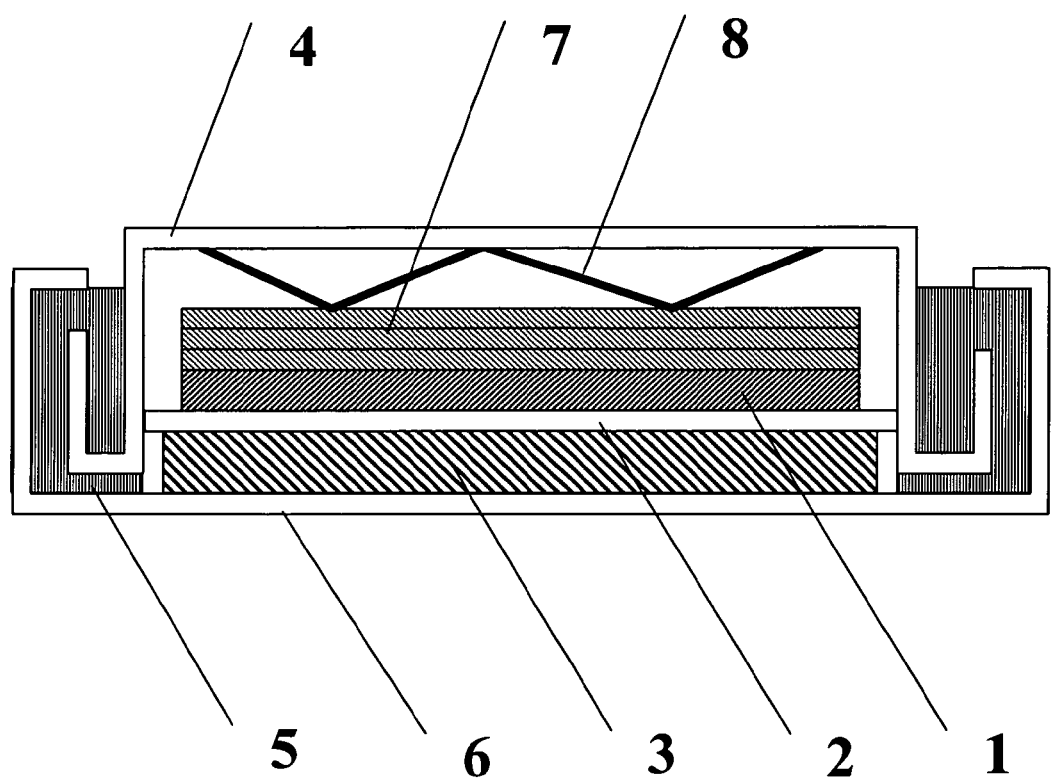
FIG. 2 illustrates a cross section of a button cell.

Batteries are disclosed. The batteries include an electrolyte activating one or more anodes and one or more cathodes. The electrolyte includes one or more salts dissolved in a solvent. In some instances, the solvent includes silanes and/or siloxanes. In some instances, the one or more salts include an organoborate salt such as lithium bis-oxalato borate (LiBOB) or lithium difluoro oxalato borate (LiDfOB). Extensive research has revealed a variety of impurities in these electrolytes. The impurities include water, a variety of organic impurities and oxalate derivatives. The organic impurities are believed to include one or more hydrocarbons; one or more alcohols; and one or more organic acids such as oxalic acid. It is currently believed that the organic impurities and water are residual materials from the synthesis and processing of the silanes, siloxanes and salts and/or are byproducts of this synthesis and processing.

The inventors have found that the cycling performance of many secondary batteries can be improved by reducing the presence of these impurities in the electrolyte. It is believed that the impurities such as water can degrade the salt while impurities such as organic acids may degrade the solvent. Without being bound to theory, these mechanisms are believed to reduce the cycle performance of batteries that include these electrolytes.

The presence of impurities can be reduced by treating one or more electrolyte components with zeolite(s) before forming the electrolyte by combining the one or more electrolyte components with other electrolyte components. In some instances, all of the electrolyte components are concurrently treated with the zeolite by forming the electrolyte and treating the electrolyte with zeolite(s). Treatment of one or more components with a zeolite can include exposing the one or more components to the zeolite(s) for a period of time followed by separating the one or more components and the zeolite. Separation of the one or more components can include filtering the zeolite from the one or components. Treatment of one or more components with zeolite(s) can include multiple sequential exposures the one or more components to the zeolite(s) and separations of the one or more components and zeolite(s). Subsequent exposures and separations can include one or more additional components and/or can employ one or more different zeolites or can employ the same component(s) and zeolite. In some instance, a different selection of one or more electrolyte component(s) is treated with different zeolite(s) that another selection of one or more electrolyte component(s). During treatment of the one or components with zeolite, suitable mass ratios for the zeolite to the one or more components include ratios less than 50 wt %, 30 wt %, or 20 wt % and/or ratios greater than 3 wt %, 1 wt % or 0.1 wt %.

As will be described in more detail below, examples of electrolyte components include, but are not limited to, salts, solvent, additives, network polymer, and solid polymer. Examples of salts include, but are not limited to, lithium salts and organoborate salts such as dihalo mono[bidentate] borates and bis[bidentate] borates. Examples of solvents include, but are not limited to, organic solvents, silanes and siloxanes such as polysiloxanes, tetrasiloxanes, trisiloxanes, and disiloxanes. Any of these components can be treated with zeolites by itself or in combination with other components. Solid components such a salt can be treated by dissolving the solid component in one or more other component and treating the combination with the zeolite. Alternately, a solid component can be dissolved in a solvent, treated with the zeolite and then extracted from the solvent. A suitable method of separating the zeolite from the solvent includes evaporation of the solvent and drying of the solid component.

A preferred component for treatment with zeolite(s) includes tetrasiloxanes, trisiloxanes, disiloxanes and/or silanes. Tetrasiloxanes, trisiloxanes, or disiloxanes can yield an electrolyte with a lower viscosity than electrolytes that include similarly structured polysiloxanes. Further, silanes can yield an electrolyte with a lower viscosity than electrolytes that include similarly structured tetrasiloxanes, trisiloxanes, or disiloxanes. The reduced viscosity can increase the conductivity of the electrolyte and can improve wetting of electrodes in an electrochemical device enough to enhance the homogeneity of the electrolyte distribution in the cell. The enhanced homogeneity can be sufficient to increase the capacity and cycling properties of batteries.

The tetrasiloxanes, trisiloxanes, disiloxanes and/or silanes can also provide an electrolyte with high ionic conductivities in addition to enhanced cycling properties. For instance, one or more of the silicons in the tetrasiloxanes, trisiloxanes, disiloxanes and/or silanes can each be linked to a first substituent that includes a poly(alkylene oxide) moiety. The poly(alkylene oxide) moieties can help dissolve lithium salts employed in the electrolyte. Accordingly, the tetrasiloxanes, trisiloxanes, disiloxanes and/or silanes can provide an electrolyte with a concentration of free ions suitable for use in batteries. Additionally, the poly(alkylene oxide) moieties can enhance the ionic conductivity of the electrolyte at room temperatures.

Additionally or alternately, one or more of the silicons in the tetrasiloxanes, trisiloxanes, disiloxanes and/or silanes can each be linked to a second substituent that includes a cyclic carbonate moiety. The cyclic carbonate moieties can have a high ability to dissolve the salts that are employed in battery electrolytes. As a result, the carbonates can provide high concentrations of free ions in the electrolyte and can accordingly increase the ionic conductivity of the electrolyte.

The siloxanes and/or or silanes can also have significant water content as a result of the synthesis method. For instance, the inventors have found that electrolytes with a solvent that is more than 50 wt % siloxane or silane is generally more than about 50 to 70 ppm water. The inventors have found that treatment of one or more electrolyte components with zeolite can provide an electrolyte that is less than 40 ppm water, 30 ppm water, or less than 20 ppm water. As is evident in the below Examples, this zeolite treatment can further enhance the cycling performance of batteries that include these components.

Suitable zeolites include, but are not limited to, molecular sieves, water absorbing powders, and/or impurity absorbing powders. Molecular sieves are crystalline metal aluminosilicates having a three dimensional interconnecting network of silica and alumina tetrahedra. Generally, water can be removed from this network by heating to produce uniform cavities which selectively adsorb molecules of a specific size. Suitable molecular sieves include, but are not limited to, 8 to 12 mesh type molecular sieves. The powdered forms of 3A, 4A, 5A and 13X molecular sieves are also suitable. The inventors have found the molecular sieves to be effective at reducing the concentration of impurities such as water, alcohols, and acids from salts, silanes and siloxanes.

In some instances, the battery includes one or more zeolites exposed to the electrolyte. For instance, one or more zeolites can be included in and/or on one or more anodes in the battery; and/or one or more zeolites can be included in and/or on one or more cathodes in the battery; and/or one or more zeolites can be included in and/or on a separator positioned between one or more anodes and one or more cathodes and/or the zeolite can be present in the electrolyte. In some instances, the zeolite is only partially separated from the one or more electrolyte components before activating the one or more anodes and one or more cathodes of a battery. As a result, the zeolite is present in the electrolyte in the final battery. This result can also be achieved by not separating the one or more components and the zeolite. The presence of the zeolite in the battery allows for extended exposure of the electrolyte to the zeolite and may permit for additional removal of impurities and may permit removal of impurities generated during discharge and/or charge of the battery. The inclusion of the zeolite in the battery can be done as an alternative to or in addition to treatment of the one or more electrolyte components with zeolite(s).

FIG. 1 is a schematic view of a suitable battery 22. The battery 22 includes an electrolyte 40 activating a cathode 42 and an anode 44. A separator 46 separates the cathode 42 and anode 44. The cathode 42 includes a cathode medium 48 on a cathode substrate 50. The anode 44 includes an anode medium 52 on an anode substrate 54. Although the battery is illustrated as including one anode and one cathode, the battery can include more than one anode and/or more than one cathode with the anodes and cathodes each separated by a separator. Additionally, the battery can have a variety of different configurations such as stacked configuration, a "jelly-roll" or wound configurations. In some instances, the battery is hermetically sealed. Hermetic sealing can reduce entry of impurities into the battery. As a result, hermetic sealing can reduce active material degradation reactions due to impurities. The reduction in impurity induced lithium consumption can stabilize battery capacity.

Suitable cathode substrates 50 include, but are not limited to, aluminum, stainless steel, titanium, or nickel substrates. An example of a cathode substrate that can enhance conductivity is a carbon coated aluminum current collector. The carbon coating may be applied using any suitable process known in the art, such as by coating a paste made of carbon and a binder. The thickness of the carbon coating can be less than 15 microns, less than 10 microns, about 3 microns or less, and less than 2 microns.

The cathode medium 48 includes or consists of one or more cathode active materials. Suitable cathode active materials include, but are not limited to, $Li_xVO_y$, $LiCoO_2$, $LiNiO_2$, $LiNi_{1-x}Co_yMe_zO_2$ $LiMn_{0.5}Ni_{0.5}O_2$, $LiMn_{(1/3)}Co_{(1/3)}Ni_{(1/3)}O_2$, $LiFePO_4$, $LiMn_2O_4$, $LiFeO_2$, $LiMc_{0.5}Mn_{1.5}O_4$, $LiMn_{1.5}McO_4$, vanadium oxide, carbon fluoride ($CF_{x''}$) and mixtures thereof wherein Me is Al, Mg, Ti, B, Ga, Si, Mn, Zn, Mo, Nb, V and Ag and combinations thereof, and wherein Mc is a divalent metal such as Ni, Co, Fe, Cr, Cu, and combinations thereof. In some instances, x is $\geq \frac{1}{3}$ before initial discharge of the battery and/or y is in a range of $\frac{7}{3}$ to 3 before initial discharge of the battery and/or x'' is $\geq 0$ before initial discharge of the battery and/or 1−x'+y'+z'=1 and/or x'' is >0 or x'' is $\geq 0.2$ before initial discharge of the battery. Example cathode materials include one or more lithium transition metal oxides selected from the group consisting of $Li_xVO_y$, $LiCoO_2$, $LiNiO_2$, $LiNi_{1-x}Co_yMe_zO_2$, $LiMn_{0.5}Ni_{0.5}O_2$, $LiMn_{(1/3)}CO_{(1/3)}Ni_{(1/3)}O_2$, $LiFePO_4$, $LiMn_2O_4$, $LiFeO_2$, $LiMc_{0.5}Mn_{1.5}O_4$.

The cathode medium 48 can optionally include binders, conductors and/or diluents such as PVDF, graphite and acetylene black in addition to the one or more cathode active materials. Suitable binders include, but are not limited to, PVdF, powdered fluoropolymer, powdered polytetrafluoroethylene or powdered polyvinylidene fluoride present at about 1 to about 5 weight percent of the cathode active material. Suitable conductors and/or diluents include, but are not limited to, acetylene black, carbon black and/or graphite or metallic powders such as powdered nickel, aluminum, titanium and stainless steel.

A cathode can be generated by mixing the components of the cathode medium in a slurry. The slurry can be coated on the substrate material and dried so as to form the cathode medium on the substrate. In instances where one or more zeolites are to be included in and/or on the cathode, the one or more zeolites can be included in the slurry before coating the slurry on the substrate or can be added to the slurry between coating the slurry onto the substrate and drying of the slurry. In some instances, the zeolite is 0.1 wt % to 10 wt % of the cathode active material in the slurry. In some instances, the zeolite is included in a slurry that includes a binder but excludes the cathode active material and the slurry coated on the cathode medium and/or on the substrate and dried. Powdered forms of the one or more zeolites may be preferred for adding to the slurry.

A suitable material for the anode substrate 54 includes, but is not limited to, lithium metal, titanium, a titanium alloy, stainless steel, nickel, copper, tungsten, tantalum and alloys thereof.

The anode medium 52 includes or consists of one or more anode active materials. In some instances, the anode medium 52 includes a binder. The anode active material can include or consist of a metal selected from Groups IA, IIA and IIIB of the Periodic Table of the Elements. Examples of these anode active materials include lithium, sodium, potassium and their alloys and intermetallic compounds. Examples of suitable alloys include, but are not limited to, Li—Si, Li—B, Li—Si—B, Li—Al. Another example of a suitable lithium alloy is a lithium-aluminum alloy. However, increasing the amounts of aluminum present in the alloy can reduce the energy density of the cell. Examples of suitable intermetallic compounds include, but are not limited to, intermetallic compounds that include or consist of two or more components selected from the group consisting of Li, Ti, Cu, Sb, Mn, Al, Si, Pb, Sn, In, Bi, Ag, Ba, Ca, Hg, Pd, Pt, Te, Zn and La. Other examples of suitable intermetallic compounds include, but are not limited to, intermetallic compounds that include lithium metal and one or more components selected from the group consisting of Ti, Cu, Sb, Mn, Al, Si, Pb, Sn, In, Bi, Ag, Ba, Ca, Hg, Pd, Pt, Te, Zn and La. Specific examples of intermetallic compounds include $Cu_6Sn_5$, $Cu_2Sb$, MnSb. Other suitable anode active materials include lithium titanium oxides such as $Li4Ti_5O_{12}$, silica alloys and mixtures of the above anode active materials. Another example of a suitable anode active material includes or consists of a carbonaceous mixture. For instance, the carbonaceous mixture can include a mixture that includes or consists of one, two or three components selected from the group consisting of: carbon beads, carbon fibers, and graphite flakes.

In some instances, the anode active material consists of lithium metal. Further, the anode active medium can serve as both the anode active medium and as the anode substrate. For instance, the anode can consist of lithium metal. The reaction potential for lithium metals to give up electrons is generally less than 1 V versus $Li/Li^+$ equilibrium potential. In instances where the anode includes a substrate, suitable methods for placing the anode active material on the anode substrate include, but are not limited to, lamination, deposition and sputtering.

When an anode is to be formed from materials in a powdered or granular form, an anode can be generated by mixing the components of the anode medium in a slurry. Coating the slurry on the substrate material and drying the slurry so as to form the anode medium on the substrate. In instances where one or more zeolites are to be included in and/or on the anode, the one or more zeolites can be included in the slurry before coating the slurry on the substrate or can be added to the slurry between coating the slurry onto the substrate and drying of the slurry. In some instances, the zeolite is 0.1 wt % to 10 wt % of the anode active material in the slurry. In some instances, the zeolite is included in a slurry that includes a binder but excludes the anode active material and the slurry coated on the anode medium and/or on the substrate and dried. Powdered forms of the one or more zeolites may be preferred for adding to a slurry.

In instances where one or more zeolites are to be included in and/or on the anode and the anode is to be constructed from metals in sheet or foil forms, the one or more zeolites can be combined with a binder and then coated onto a surface of the anode active medium and/or the anode substrate. Suitable binders include, but are not limited to, PVDF, EPDM and polyimide. In some instances, the zeolite is 0.1 wt % to 10 wt % of the anode active material in the anode.

Suitable separators 46 include, but are not limited to, polyolefins such as polyethylene. Illustrative separator materials also include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene/polyethylene membrane commercially available under the designation CELGARD (Celanese Plastic Company, Inc.), a membrane commercially available under the designation DEXIGLAS (C. H. Dexter, Div., Dexter Corp.), and a polyethylene membrane commercially available from Tonen Chemical Corp.

In instances where one or more electrolytes are to be included in and/or on the separator, the separator can be generated by mixing the one or more zeolites with precursors for the separator and then forming the separator. For instance, the one or more zeolites can be combined with monomers for the separator which can then be polymerized. Alternately, the separator material can be liquefied and the one or more zeolites added to the liquid before returning the separator to a solid state. In some instances, the above operations can be performed with polyolefins, polyimides, polyesters, polyethers, and modified polyolefins such as PVdF. In some instances, the zeolite is less than 30 wt % of the separator as higher concentrations can reduce the strength of the separator. In addition to absorbing impurities, the zeolite can enhance protection against a short between the anode and cathode.

The electrolyte includes one or more salts in a solvent. The one or more salts can include or consist of an organoborate salts. Suitable organoborate salts include lithium organoborate salt. The organoborate salt can be a bis[bidentate] borate, also known as a bis[chelato] borate. Suitable bis[bidentate] borates include aromatic bis[bidentate] borates such as bis[benzenediolato (2-)-O,O'] borate, bis[substituted benzenediolato (2-)-O,O'] borate, bis[salicylato] borate, bis[substituted salicylato] borate, bis[2,2'-biphenyldiolato (O,O')] borate, and bis[substituted 2,2'-biphenyldiolato (O,O')] borate]. In some instances, the organoborate salt is a nonaromatic bis[bidentate] borate, such as bis[oxalato (2-)-O,O'] borate, bis[malonato (2-)-O,O'] borate, bis[succinato] borate,

[.alpha.-hydroxy-carboxylato]borate, [.alpha.-hydroxy-carboxylato]borate, [.beta.-hydroxy-carboxylato]borate, [.beta.-hydroxy-carboxylato]borate, [.alpha.-dicarboxylato]borate, and [.alpha.-dicarboxylato]borate. Examples of lithium bis(bidentate) salts include lithium bis(tetrafluoroethylenediolato)borate LiB(OCF$_2$CF$_2$O)$_2$, lithium bis(hexafluoropropylenediolato)borate LiB[OCF(CF$_3$)CF$_2$O]$_2$ and lithium bis[1,2-tetrakis(trifluoromethyl)ethylenedialato (2-)O,O'-] borate or lithium bis(perfluoropinacolato)borate LiB[OC(CF$_3$)$_2$C(CF$_3$)$_2$O]$_2$. A preferred lithium bis(bidentate) salt is lithium bis-oxalato borate (LiBOB).

One example of the organoborate salt includes: a boron linked directly to at least two oxygens and an organic moiety linking two of the oxygens. In some instances, the boron is also linked directly to two halogens. Another example of the organoborate salt includes: a boron linked directly to each of four oxygens; a first organic moiety linking two of the oxygens; and a second organic moiety linking the other two oxygens. The first organic moiety and the second organic moiety can be the same or different. The first organic moiety and/or the second organic moiety can be: substituted or unsubstituted; and/or branched or unbranched; and/or saturated or unsaturated. The backbone of an organic moieties extending between the boron linked oxygens can include only carbons or can include carbons and one or more oxygens. In some instances, one or both of the organic moieties are halogenated. In one example, the first organic moiety and/or the second organic moiety is fluorinated.

An example of the organoborate salt is represented by the following Formula I-A:

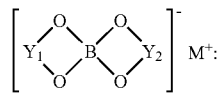

wherein M$^+$ is a metal ion selected from the Group I or Group II elements; Y$_1$ and Y$_2$ are each selected from the group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$ or R'; Z' is alkyl, halogenated alkyl, —C=NR', CR'$_3$ or R'; R' is halogen or hydrogen; R is hydrogen, alkyl, halogenated alkyl, cyano, or halogen; a is 0 to 4 and b is 1 to 4. M$^+$ is preferably selected from Group I and is most preferably lithium. Y$_1$ and Y$_2$ can be the same or different. Z and Z' can be the same or different. The R' can be the same or different and the R can be the same or different.

In an example of an organoborate salt according to Formula I-A, Y$_1$ and Y$_2$ are each —CX(CR$_2$)$_a$CX—; each X is =O and each R is hydrogen. In another example of the organoborate salt, Y$_1$ and Y$_2$ are each —CX(CR$_2$)$_a$CX—; each X is =O and each R is a halogen. In another example of the organoborate salt, Y$_1$ and Y$_2$ are each —CX(CR$_2$)$_a$CX—; each X is =O and each R is fluoro.

In a preferred example of an organoborate salt according to Formula I-A, Y$_1$ and Y$_2$ are each —CZZ'(CR$_2$)$_a$CZZ'—; each of the R' is hydrogen and each of the R are hydrogen. In another preferred example, Y$_1$ and Y$_2$ are each —CZZ'(CR$_2$)$_a$CZZ'—; each of the R' is halogen and each of the R are halogens. In another preferred example, Y$_1$ and Y$_2$ are each —CZZ'(CR$_2$)$_a$CZZ'—; each of the R' is fluorine and each of the R are fluorine.

Other suitable organoborate salts for use with the battery include mono[bidentate] borates. For instance, the salt can be a dihalo mono[bidentate] borate such as a dihalo oxalato borate. An example of a dihalo oxalato borate is a difluoro oxalato borate. The organoborate salts can be lithium organoborate salts such as lithium mono[bidentate] borate. For instance, the salt can be a lithium dihalo mono[bidentate] borate such as a lithium dihalo oxalato borate. A preferred lithium dihalo oxalato borate is a lithium difluoro oxalato borate (LiDfOB).

The organoborate salt can include a boron linked directly to two halogens and also linked directly to two oxygens that are linked to one another by an organic moiety. The organic moiety and/or the second organic moiety can be: substituted or unsubstituted; and/or branched or unbranched; and/or saturated or unsaturated. The backbone of the organic moiety can include only carbons or can include carbons and one or more oxygens. In some instances, the organic moiety is completely or partially halogenated. In one example, the organic moiety is fluorinated.

An example of the organoborate salt is represented by the following Formula I-B:

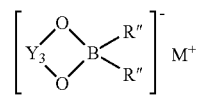

wherein M$^+$ is a metal ion selected from the Group I or Group II elements; Y$_3$ is selected from the group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$ or R'; Z' is alkyl, halogenated alkyl, —C=NR', CR'$_3$ or R'; R" is a halogen; R' is halogen or hydrogen; R is hydrogen, alkyl, halogenated alkyl, cyano, or halogen; a is 0 to 4 and b is 1 to 4. M$^+$ is preferably selected from Group I and is most preferably lithium. Z and Z' can be the same or different. The R" can be the same or different. The R' can be the same or different. The R can be the same or different.

In an example of an organoborate salt according to Formula I-B, Y$_3$ is —CX(CR$_2$)$_a$CX—; each X is =O and each R" is a halogen. In another example of the organoborate salt, Y$_3$ is —CX(CR$_2$)$_a$CX— and each R" is a fluorine.

In some instances, the organoborate salt is a tridentate borate such as a lithium tridentate borate. Alternately, the organoborate salt can be a tetradentate borate such as lithium tetradentate borate. An example lithium tetradentate borate includes LiB[OC(CF$_3$)$_2$]$_4$.

Examples of other organoborate salts are disclosed in U.S. Provisional Patent Application Ser. No. 60/565,211, filed on Apr. 22, 2004, entitled "Organoborate Salt in Electrochemical Device Electrolytes," and incorporated herein in its entirety; and in U.S. Provisional Patent Application Ser. No. 60/563,850, filed on Apr. 19, 2004, entitled "Organoborate Salt in Electrochemical Device Electrolytes," and incorporated herein in its entirety; and in U.S. Provisional Patent Application Ser. No. 60/563,848, filed on Apr. 19, 2004, entitled "Composition Check for Organoborate Salt Employed in Electrochemical Device Electrolytes," and incorporated herein in its entirety.

The electrolyte can include one or more salts in addition to the organoborate salt. Suitable salts for use with the electrolyte include, but are not limited to, alkali metal salts including lithium salts. Examples of lithium salts include LiClO$_4$, $LiBF_4$, $LiAsF_6$, $LiPF_6$, $LiSbF_6$, $LiCF_3SO_3$, $LiC_6F_5SO_3$, $LiC_4F_9CO_2$, $LiC(CF_3SO_2)_3$, $LiN(SO_2C_2F_5)_2$, $LiN(SO_2CF_3)_2$, $LiAlCl_4$, $LiGaCl_4$, $LiSCN$, $LiO_2$, $LiO_3SCF_3$, $LiO_2CCF_3$, $LiSO_6F$, $LiB(C_6H_5)_4$, $LiB_{10}Cl_{10}$, lithium lower aliphatic carboxylate, chloroboran lithium, lithium tetraphenylborate, LiBr, LiI, LiSCN, LiCl, imides, Li-methide, Li-imide, lithium alkyl fluorophosphates and mixtures thereof.

The electrolyte can be prepared such that the concentration of the one or more salts in the electrolytes is about 0.3 to 2.0 M, about 0.5 to 1.5 M, or about 0.7 to 1.2 M. The one or more organoborate salts are preferably present in the electrolyte at a concentration of about 0.3 to 2.0 M, about 0.5 to 1.5 M, or about 0.7 to 1.2 M. In some instances, the one or more organoborate salts are present in a concentration less than 0.3 M or less than 0.1 M and other salts are present in the electrolyte.

The solvent can include or consist of one or more polysiloxanes having a backbone with five or more silicons. One or more of the silicons can be linked to a first substituent and/or to a second substituent. The first substituent includes a poly(alkylene oxide) moiety and the second substituent includes a cyclic carbonate moiety. Suitable first substituents include side chains or cross links to other polysiloxanes. Further, each of the first substituents can be the same or different. In one example of the polysiloxane, each of the first substituents is a side chain. Suitable second substituents include side chains. Further, each of the second substituents can be the same or different. Each of the second substituents can be the same or different. In some instances, the terminal silicons in the backbone are not linked to either a first substituent or a second substituent. Each of the non-terminal silicons can be linked to at least one first substituent or to at least one second substituent. In some instances, the polysiloxane excludes second substituents. One or more of the silicons in the backbone of the polysiloxane can be linked to a cross-link to another polysiloxane. The cross-link can include a poly(alkylene oxide) moiety. Examples of suitable polysiloxanes are disclosed in U.S. patent application Ser. No. 10/810,019, filed on Mar. 25, 2004, entitled "Polysiloxane for Use in Electrochemical Cells," and incorporated herein in its entirety.

Examples of suitable polysiloxanes have a structure according to General Formula

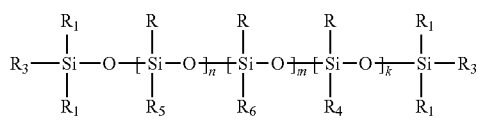

where R is alkyl or aryl; $R_1$ is alkyl or aryl; $R_3$ is represented by:

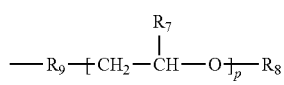

or

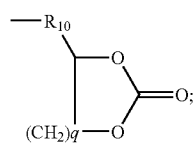

$R_4$ is a cross link that links the polysiloxane backbone to another polysiloxane backbone; $R_5$ is represented by:

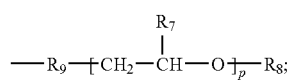

$R_6$ is represented by:

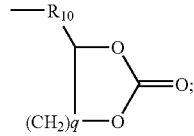

$R_7$ is hydrogen; alkyl or aryl; $R_8$ is alkyl or aryl; $R_9$ is oxygen or an organic spacer; $R_{10}$ is an oxygen or an organic spacer; k is 0 or greater than 0; p is 3, greater than 3 and/or less than 20; q is 1 to 2; m is 0 or greater than 0 and n is 0 or greater than 0 and can be 2 to 25. In some instances, n+m+k is 3 or greater than 3. In some instances, m is greater than 0 and a ratio of n:m is 1:1 to 100:1 and is more preferably 5:1 to 100:1. One or more of the alkyl and/or aryl groups can be substituted, unsubstituted, halogenated, and/or fluorinated. A suitable organic spacer can include one or more —$CH_2$— groups. Other suitable spacers can include an alkylene, alkylene oxide, or bivalent ether moiety. These spacers can be substituted or unsubstituted. The above spacers can be completely or partially halogenated. For instance, the above spacers can be completely or partially fluorinated. In one example, $R_9$ is represented by: —O—$(CH_2)_3$—O— or —$(CH_2)_3$—O— with the oxygen linked to the polyethylene oxide moiety. In another example, $R_{10}$ is represented by: —$CH_2$—O—$(CH_2)_3$— where the single —$CH_2$— group is positioned between the carbonate and the oxygen or —$CH_2$—O—.

In instances, where a polysiloxane according to Formula II includes one or more cross links, a suitable ratio for (number of cross links):(m+n) includes, but is not limited to, a ratio in a range of 1:4 to 1:200, in a range of 1:6 to 1:100, or in a range of 1:6 to 1:70.

Each of the $R_3$ can be the same or different. In some instances, one of the $R_3$ includes a poly(alkylene oxide) moiety and another $R_3$ includes a cyclic carbonate moiety. The structures of $R_3$ can be the same as the structure of $R_5$. In some instances, the $R_3$ structures are different from the $R_5$ structures. When m is greater than 0, the structures of $R_3$ can be the same as the structure of $R_6$. In some instances, the $R_3$ structures are different from the structure of $R_6$. In some instances, m is 0 and $R_3$ and $R_5$ each have a structure according to:

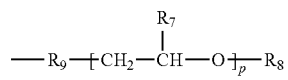

and the structures for $R_3$ are different from the structure for $R_5$ or the same as the structure for $R_5$.

When a polysiloxane according to General Formula I is to be employed in an electrolyte, a suitable average molecular weight for the polysiloxane includes, but is not limited to, an average molecular weight less than or equal to 3000 g/mole.

The solvent can include or consist of one or more tetrasiloxanes. Tetrasiloxanes can have a reduced viscosity relative to similarly structured tetrasiloxanes. A suitable tetrasiloxane has a backbone with two central silicons and two terminal silicons. One or more of the silicons can be linked to a first substituent and/or to a second substituent. The first substituent includes a poly(alkylene oxide) moiety and the second substituent includes a cyclic carbonate moiety. Suitable first substituents include side chains or cross links to other tetrasiloxanes. Further, each of the first substituents can be the same or different. In one example of the tetrasiloxane, each of the first substituents is a side chain. Suitable second substituents include side chains. Further, each of the second substituents can be the same or different. Each of the second substituents can be the same or different. In some instances, the terminal silicons in the backbone are not linked to either a first substituent or a second substituent. Each of the central silicons can be linked to at least one first substituent or to at least one second substituent. In some instances, the tetrasiloxane excludes second substituents. One or more of the silicons in the backbone of the tetrasiloxane can be linked to a cross-link to another tetrasiloxane. The cross-link can include a poly(alkylene oxide) moiety. Examples of suitable tetrasiloxanes are disclosed in U.S. Provisional Patent Application Ser. No. 60/543,951, filed on Feb. 11, 2004, entitled "Siloxane;" and in U.S. patent application Ser. No. 10/971,926, filed on Oct. 21, 2004, entitled "Electrochemical Device Having Electrolyte Including Tetrasiloxane;" and incorporated herein in its entirety.

An example of a suitable tetrasiloxane includes a backbone with a first silicon linked to a first side chain that includes a poly(alkylene oxide) moiety. Additionally, a second silicon in the backbone is linked to a second side chain that includes a poly(alkylene oxide) moiety or a cyclic carbonate moiety. In some instances, the first silicon and the second silicon are each terminal silicons. In other instances, the first silicon and the second silicon are each central silicons.

As the number of substituents that include a poly(alkylene oxide) moiety and/or a cyclic carbonate moiety increases, the viscosity of an electrolyte can increase undesirably and/or the ionic conductivity of an electrolyte can decrease undesirably. As a result, in some instances, the tetrasiloxane includes no more than two poly(alkylene oxide) moieties or no more than one poly(alkylene oxide) moiety. Additionally or alternatively, the tetrasiloxane can include no more than two carbonate moieties or no more than one carbonate moiety. For instance, a third one of the silicons and a fourth one of the silicons can each be linked to entities that each exclude a poly(alkylene oxide) moiety and/or that each exclude a cyclic carbonate moiety. For instance, the third silicon and the fourth silicon can each be linked to substituents such as side chains that each exclude a poly(alkylene oxide) moiety and/or that each exclude a cyclic carbonate moiety. In some instances, the entities linked to the backbone of the tetrasiloxane other than the first side chain and the second side chain each exclude a poly(alkylene oxide) moiety and/or a cyclic carbonate moiety. For instance, the entities linked to the backbone of the tetrasiloxane other than the first side chain and the second side chain can each be a substituent such as a side chain and each of these substituents can exclude a poly(alkylene oxide) moiety and/or a cyclic carbonate moiety.

A silicon on the tetrasiloxane backbone can be linked directly to a poly(alkylene oxide) moiety or a spacer can be positioned between the poly(alkylene oxide) moiety and the silicon. The spacer can be an organic spacer. When the first silicon and the second silicon are each central silicons linked directly to a side chain that includes a poly(alkylene oxide) moiety, the poly(alkylene oxide) moieties each include an oxygen linked directly to the backbone. The poly(alkylene oxide) moiety can be an oligo(alkylene oxide) moiety. In some instances, the poly(alkylene oxide) moiety is a poly(ethylene oxide) moiety.

When a silicon is linked to side chains that includes a cyclic carbonate moiety, the side chain can include a spacer that links the carbonate moiety to the silicon or an oxygen can link the cyclic carbonate moiety to the silicon. The spacer can be an organic spacer.

In instances where the first silicon and the second silicons are each terminal silicons, the first and second silicons can each be linked to a side chain that includes a poly(alkylene oxide) moiety. Formula III provides an example of a tetrasiloxane where the first silicon and the second silicon are each terminal silicons linked to a side chain that includes a polyethylene oxide moiety. Formula III:

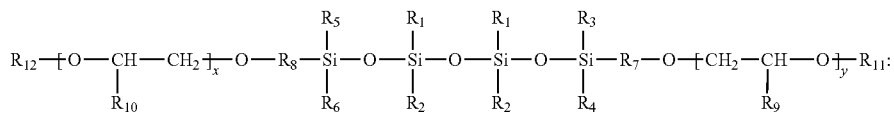

wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is nil or a spacer; $R_8$ is nil or a spacer; $R_9$ is a hydrogen, an alkyl group or an aryl group; $R_{10}$ is a hydrogen, an alkyl group or an aryl group; $R_{11}$ is an alkyl group or an aryl group; and $R_{12}$ is an alkyl group or an aryl group; x is 1 or greater and/or 12 or less and y is 1 or greater and/or 12 or less. One or more of the alkyl and/or aryl groups can be substituted, unsubstituted, halogenated, and/or fluorinated. The spacers can be organic spacers and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_7$ and $R_8$ are each nil or are each a spacer. In one example, $R_7$ and/or $R_8$ is represented by: —$(CH_2)_3$—. In one example: $R_1$; $R_2$; $R_3$; $R_4$; $R_5$; $R_6$; $R_{11}$; and $R_{12}$ are each methyl groups.

Examples of preferred tetrasiloxanes according to Formula III are represented by Formula III-A through Formula III-B. Formula III-A illustrates an example of a tetrasiloxane having terminal silicons linked to side chains that include an organic spacer linking a poly(alkylene oxide) moiety to a terminal silicon. Formula III-B illustrates an example of a tetrasiloxane having terminal silicons that are each linked to an oxygen included in a poly(alkylene oxide) moiety.

Formula III-A:

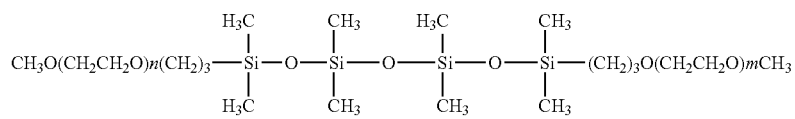

wherein n is 1 to 12 and m is 1 to 12.

Formula III-B:

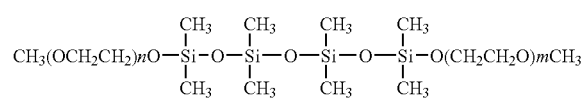

wherein n is 1 to 12 and m is 1 to 12.

Another suitable tetrasiloxane has a backbone with one of two central silicons linked to a side chain that includes a poly(alkylene oxide) moiety and the other central silicon linked to a side chain that includes a poly(alkylene oxide) moiety or a carbonate moiety. When each of the central silicons is linked to a side chain that includes a poly(alkylene oxide) moiety, the poly(alkylene oxide) moieties each include an oxygen linked directly to a silicon in the backbone.

Another example of a suitable tetrasiloxane is represented by Formula IV.

Formula IV:

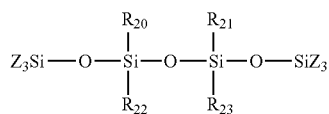

wherein: $R_{20}$ is an alkyl group or an aryl group; $R_{21}$ is an alkyl group or an aryl group; $R_{22}$ is represented by Formula IV-A; $R_{23}$ is represented by Formula IV-B or IV-C and each Z is an alkyl or an aryl group. The Zs can be the same or can be different.

Formula IV-A:

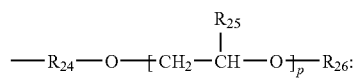

wherein $R_{24}$ is an organic spacer or nil; $R_{25}$ is hydrogen, alkyl or aryl; $R_{26}$ is alkyl or aryl and p is 1 or more and/or 12 or less. The organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{24}$ is represented by: —$(CH_2)_3$—.

Formula IV-B:

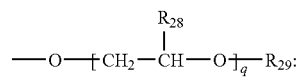

wherein $R_{28}$ is hydrogen, alkyl or aryl; $R_{29}$ is alkyl or aryl; q is 1 or more and/or 12 or less.

Formula IV-C:

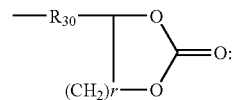

wherein $R_{30}$ is an organic spacer and r is 1 or 2. Suitable organic spacers for Formula IV through IV-C can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{30}$ is a bivalent ether moiety represented by: —$CH_2$—O—$(CH_2)_3$— with the —$(CH_2)_3$— linked to a silicon on the backbone of the tetrasiloxane. In another example, $R_{30}$ is an alkylene oxide moiety represented by: —$CH_2$—O— with the oxygen linked to a silicon on the backbone of the tetrasiloxane.

One or more of the alkyl and aryl groups specified in Formula IV through Formula IV-C can be substituted, unsubstituted, halogenated, and/or fluorinated. When $R_{23}$ is according to Formula IV-B, $R_{24}$ can be nil or can be a spacer. In one example, $R_{23}$ is according to Formula IV-C and $R_{30}$ is represented by: —$CH_2$—O—$(CH_2)_3$— where the single —$CH_2$— group is positioned between the carbonate and the oxygen. In an example, the Zs, $R_{20}$, $R_{21}$, $R_{26}$, and $R_{29}$ are each a methyl group. In another example, $R_{22}$ is represented by Formula IV-A and $R_{23}$ is represented by Formula IV-B and in another example $R_{23}$ is represented by Formula IV-A and $R_{23}$ is represented by Formula IV-C.

Examples of tetrasiloxanes according to Formula IV are represented by Formula IV-D through Formula IV-F. Formula IV-D represents a tetrasiloxane where each of the central silicons is linked to a side chain that includes a poly(ethylene oxide) moiety. The central silicons are each linked directly to an oxygen included in a poly(ethylene oxide) moiety. Formula IV-E and Formula IV-F each represent an example of a tetrasiloxane wherein a central silicon is linked to a side chain that includes a poly(alkylene oxide) moiety and another central silicon is linked to a side chain that includes a carbonate moiety. In Formula IV-E, an organic spacer is positioned between the poly(alkylene oxide) moiety and the silicon. In Formula IV-F, a silicon is linked directly to an oxygen included in a poly(alkylene oxide) moiety.

Formula IV-D:

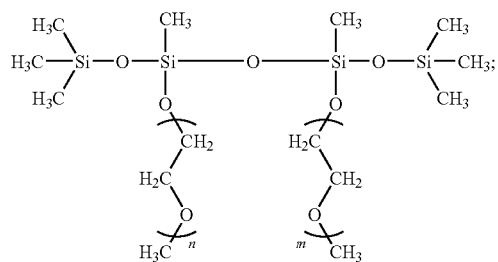

wherein n is 1 to 12.

Formula IV-E:

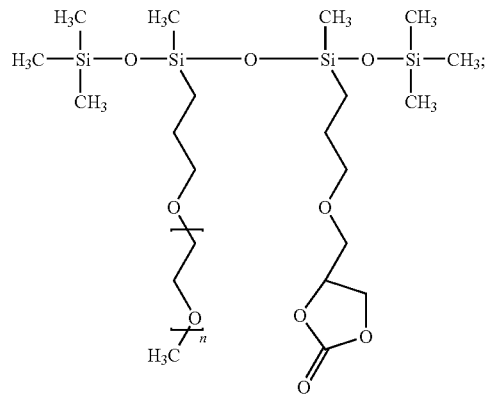

wherein n is 1 to 12.

Formula IV-F:

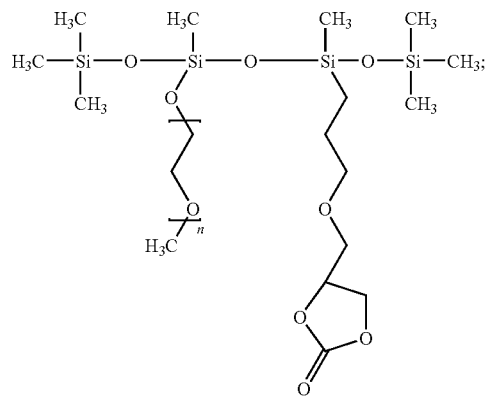

wherein n is 1 to 12.

The solvent can include or consist of one or more trisiloxanes. Trisiloxanes can have a reduced viscosity relative to similarly structured, polysiloxanes and tetrasiloxanes. A suitable trisiloxane has a backbone with three silicons. One or more of the silicons is linked to a first substituent and/or to a second substituent. The first substituent includes a poly(alkylene oxide) moiety and the second substituent includes a cyclic carbonate moiety. Suitable first substituents include side chains or cross links to other trisiloxanes. When the trisiloxanes includes more than one first substituent, each of the first substituents can be the same or different. In one example of the polysiloxane, each of the first substituents is a side chain. Suitable second substituents include side chains. When the trisiloxanes includes more than one second substituent, each of the second substituents can be the same or different. In some instances, the terminal silicons in the backbone are not linked to either a first substituent or a second substituent. The central silicons can be linked to at least one first substituent or to at least one second substituent. In some instances, the trisiloxane excludes second substituents. One or more of the silicons in the backbone of the trisiloxane can be linked to a cross-link to another trisiloxane. The cross-link can include a poly(alkylene oxide) moiety. Examples of suitable trisiloxanes are disclosed in U.S. Provisional Patent Application Ser. No. 60/543,951, filed on Feb. 11, 2004, entitled "Siloxane;" and in U.S. Provisional Patent Application Ser. No. 60/542,017, filed on Feb. 4, 2004, entitled "Non-aqueous Electrolyte Solvents for Electrochemical Devices;" and in U.S. Provisional Patent Application Ser. No. 60/543,898, filed on Feb. 11, 2004, entitled "Siloxane Based Electrolytes for Use in Electrochemical Devices;" and in U.S. patent application Ser. No. 10/971,913, filed on Oct. 21, 2004, entitled "Electrochemical Device Having Electrolyte Including Trisiloxane;" each of which is incorporated herein in its entirety.

A suitable trisiloxane includes a backbone with a first terminal silicon, a central silicon and a second terminal silicon. The first terminal silicons is linked to a first side chain that includes a poly(alkylene oxide) moiety or that includes a cyclic carbonate moiety. The second terminal silicon is linked to a second side chain that includes a poly(alkylene oxide) moiety or that includes a cyclic carbonate moiety. The first side chain and the second side chain can each include a poly(alkylene oxide) moiety or can each include a cyclic carbonate moiety. Alternately, the first side can include a poly(alkylene oxide) moiety and the second side chain can include a cyclic carbonate moiety. In one example, the second side chain includes a cyclic carbonate moiety and the first side chain includes an organic spacer linking a poly(alkylene oxide) moiety to the first terminal silicon.

As the number of substituents that include a poly(alkylene oxide) moiety and/or a cyclic carbonate moiety increase, the viscosity of an electrolyte can increase undesirably and/or the ionic conductivity of an electrolyte can decrease undesirably. As a result, the trisiloxane can include no more than two poly(alkylene oxide) moieties or no more than one poly(alkylene oxide) moiety. Additionally or alternately, the trisiloxane can include no more than two carbonate moieties or no more than one carbonate moiety. For instance, each of the entities linked to the central silicon can exclude a poly(alkylene oxide) moiety and/or a cyclic carbonate moiety. Additionally or alternately, the entities linked to the first terminal silicon other than the first side chain and the entities linked to the second terminal silicon other than the second side chain can each exclude a poly(alkylene oxide) moiety and/or a cyclic carbonate moiety. In one example, each of the entities linked to the silicons in the backbone of the trisiloxane other than the first side chain and other than the second side chain exclude both a poly(alkylene oxide) moiety and a cyclic carbonate moiety. Examples of entities that may be linked to the silicons include, but are not limited to, substituents such as side chains, cross-links and halogens.

Formula V provides an example of the trisiloxane. Formula V:

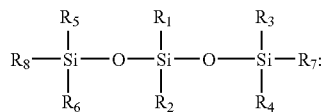

wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is represented by Formula V-A or Formula V-B; $R_8$ is represented by Formula V-C or Formula V-D.

Formula V-A:

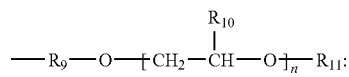

wherein $R_9$ is nil or a spacer; $R_{10}$ is hydrogen; alkyl or aryl; $R_{11}$ is alkyl or aryl; and n is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_9$ is represented by: —$(CH_2)_3$—.

Formula V-B:

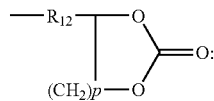

wherein $R_{12}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{12}$ is a bivalent ether moiety represented by: —$CH_2$—O—$(CH_2)_3$— with the —$(CH_2)_3$— linked to a silicon on the backbone of the trisiloxane. In another example, $R_{12}$ is a alkylene oxide moiety represented by: —$CH_2$—O— with the oxygen linked to a silicon on the backbone of the trisiloxane.

Formula V-C:

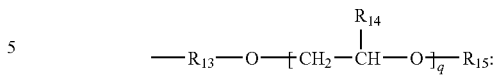

wherein $R_{13}$ is nil or a spacer; $R_{14}$ is hydrogen; alkyl or aryl; $R_{15}$ is alkyl or aryl; and q is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{13}$ is represented by: —$(CH_2)_3$—.

Formula V-D:

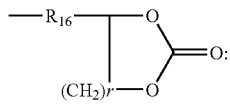

wherein $R_{16}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{16}$ is a bivalent ether moiety represented by: —$CH_2$—O—$(CH_2)_3$— with the —$(CH_2)_3$— linked to a silicon on the backbone of the trisiloxane. In another example, $R_{16}$ is a alkylene oxide moiety represented by: —$CH_2$—O— with the oxygen linked to a silicon on the backbone of the trisiloxane.

One or more of the alkyl and aryl groups specified in Formula V through Formula V-D can be substituted, unsubstituted, halogenated, and/or fluorinated. In one example of a trisiloxane according to Formula V, $R_7$ is represented by Formula V-A with $R_9$ as an organic spacer and $R_8$ is represented by Formula V-C with $R_{13}$ as an organic spacer. In another example of a trisiloxane according to Formula V, $R_7$ is represented by Formula V-A with $R_9$ as nil and $R_8$ is represented by Formula V-C with $R_{13}$ as nil. In another example of a trisiloxane according to Formula V, $R_7$ is represented by Formula V-B and $R_8$ is represented by Formula V-D. In another example of a trisiloxane according to Formula V, $R_7$ is represented by Formula V-A with $R_9$ as an organic spacer and $R_8$ is represented by Formula V-D. In another example of a trisiloxane according to Formula V, $R_7$ is represented by Formula V-A with $R_9$ as an organic spacer and $R_8$ is represented by Formula V-D. In some instances, $R_1$, $R_2$, $R_3$, $R_4$, $R_5$, and $R_6$ is each a methyl group.

Formula V-E through Formula V-H are examples of trisiloxanes according to Formula V. Formula V-E and Formula V-F each illustrate a trisiloxane where each of the terminal silicons are linked to a side chain that includes a poly(ethylene oxide) moiety. Formula V-E illustrates an organic spacer positioned between each poly(ethylene oxide) moiety and the terminal silicon. Formula V-F illustrates each of the terminal silicons linked directly to a poly(ethylene oxide) moiety.

Formula V-E:

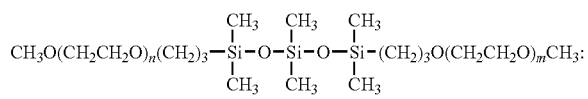

wherein n is 1 to 12 and m is 1 to 12.

Formula V-F:

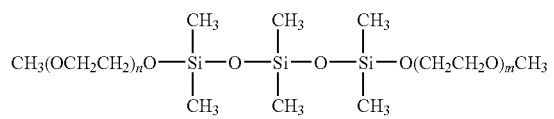

wherein n is 1 to 12 and m is 1 to 12.

Formula V-G and Formula V-H each illustrate a trisiloxane with a terminal silicon linked to a side chain that includes a cyclic carbonate moiety. Formula V-G illustrates one of the terminal silicon linked to a side chain that includes a cyclic carbonate moiety and one of the terminal silicons linked to a side chain that includes a poly(ethylene oxide) moiety. Formula V-H illustrates each of the terminal silicons linked to a side chain that includes a cyclic carbonate moiety.

Formula V-G:

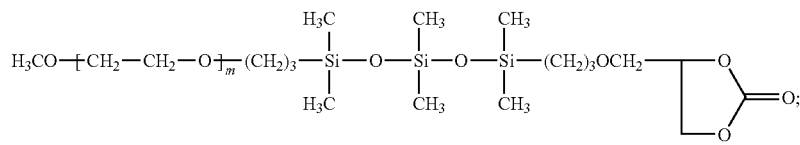

wherein m is 1 to 12.

Formula V-H:

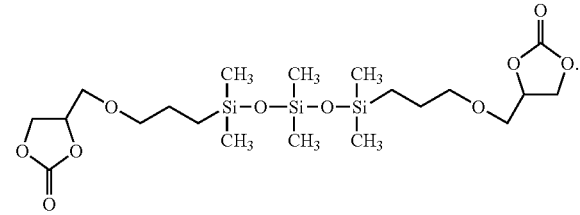

Another suitable trisiloxane includes a backbone with a first terminal silicon, a central silicon and a second terminal silicon. The central silicon is linked to a central substituent. The central substituent can be a side chain that includes a cyclic carbonate moiety, or that includes a poly(alkylene oxide) moiety linked directly to the central silicon. Alternately, the central substituent can be a cross-link that cross links the trisiloxane to a second siloxane and that includes a poly(alkylene oxide) moiety.

In some instances, the trisiloxane includes not more than two poly(alkylene oxide) moieties or not more than one poly(alkylene oxide) moiety. Additionally or alternately, the trisiloxane can include not more than two carbonate moieties or not more than one carbonate moiety. The entities linked to the first terminal silicon and the entities linked to the second terminal silicon can each exclude a poly(alkylene oxide) moiety and/or each exclude a cyclic carbonate moiety. Additionally or alternately, the entities linked to the central silicon, other than the central substituent, can exclude a poly(alkylene oxide) moiety and/or exclude a cyclic carbonate moiety. In one example, each of the entities linked to the silicons in the backbone of the trisiloxane, other than the central substituent, exclude both a poly(alkylene oxide) moiety and a cyclic carbonate moiety. Examples of entities that may be linked to the silicons include, but are not limited to, substituents such as side chains, halogens and cross-links.

An example of the trisiloxane is represented by the following Formula VI:

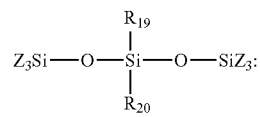

wherein $R_{19}$ is an alkyl group or an aryl group; $R_{20}$ is represented by Formula VI-A, Formula VI-B or Formula VI-C; and the Zs are each an alkyl or an aryl group and can be the same or different.

Formula VI-A:

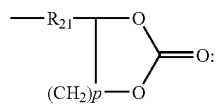

wherein $R_{21}$ is an organic spacer and p is 1 to 2. Suitable organic spacers can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{21}$ is a bivalent ether moiety represented by: —$CH_2$—O—$(CH_2)_3$— with the —$(CH_2)_3$— linked to a silicon on the backbone of the trisiloxane. In another example, $R_{21}$ is a alkylene oxide moiety represented by: —$CH_2$—O— with the oxygen linked to a silicon on the backbone of the trisiloxane.

Formula VI-B:

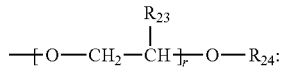

wherein $R_{23}$ is hydrogen; alkyl or aryl; $R_{24}$ is alkyl or aryl; and r is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{22}$ is represented by: —$(CH_2)_3$—.

Formula VI-C:

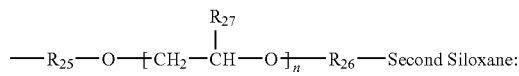

where $R_{25}$ is nil or a spacer; $R_{26}$ is nil or a spacer; $R_{27}$ is hydrogen, alkyl or aryl; second siloxane represents another siloxane and n is 1 to 12. When $R_{25}$ and/or $R_{26}$ is a spacer, the spacer can be an organic spacer and can include one or more groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. When $R_{26}$ is a spacer, $R_{26}$ can be linked to a silicon in the backbone of the second siloxane. When $R_{26}$ is nil, the poly(ethylene oxide) moiety can be linked to a silicon in the backbone of the second siloxane. The second siloxane can represent another trisiloxane. When the second siloxane is a trisiloxane, $R_{26}$ or the poly(ethylene oxide) moiety can be linked to a central silicon in the backbone of the second trisiloxane.

One or more of the alkyl and aryl groups specified in Formula VI through Formula VI-C can be substituted, unsubstituted, halogenated, and/or fluorinated. In one example of a trisiloxane according to Formula VI, $R_{20}$ is represented by Formula VI-A. In another example of the trisiloxane, $R_{20}$ is represented by Formula VI-B. In another example, $R_{20}$ is represented by Formula VI-C, $R_{25}$ is nil, $R_{26}$ is nil and the poly(ethylene oxide) moiety is linked to a silicon in the backbone of the second siloxane. In another example, $R_{20}$ is represented by Formula VI-C, $R_{25}$ is a spacer, $R_{26}$ is a spacer linked to a silicon in the backbone of the second siloxane. In another example, $R_{25}$ is a spacer with the same structure as $R_{26}$. In another example of a trisiloxane according to Formula VI, $R_{19}$ and each of the Z represent methyl groups.

Formula VI-D through Formula VI-F are examples of trisiloxanes according to Formula VI. Formula VI-D illustrates a trisiloxane where the central silicon is linked to a side chain that includes a poly(ethylene oxide) moiety linked directly to the central silicon.

Formula VI-D:

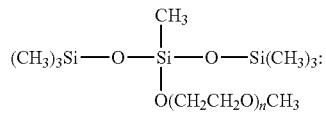

wherein n is 1 to 12.

Formula VI-E and Formula VI-F illustrate trisiloxanes having a central silicon linked to a cross link that includes a poly(ethylene oxide) moiety and that cross-links the trisiloxane to a second trisiloxane. Formula VI-E illustrates the cross link including a spacer positioned between the poly(ethylene oxide) moiety and each of the trisiloxanes. Formula VI-F illustrates a silicon in the backbone of each trisiloxane linked directly to a poly(ethylene oxide) moiety. Formula VI-E:

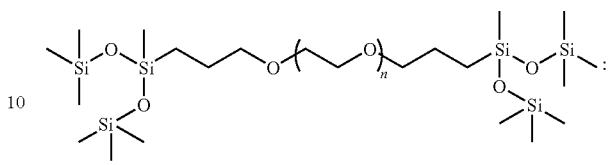

wherein n is 1 to 12. Formula VI-F:

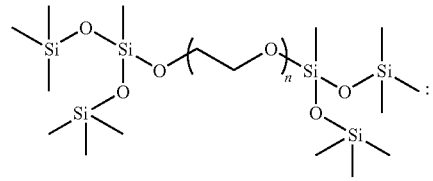

wherein n is 1 to 12.

The solvent can include or consist of one or more disiloxanes. Disloxanes can have a reduced viscosity relative to similarly structured, polysiloxanes, tetrasiloxanes and trisiloxanes. An example of a suitable disiloxane includes a backbone with a first silicon and a second silicon. The first silicon is linked to one or more first substituents that each include a poly(alkylene oxide) moiety or a cyclic carbonate moiety. The first substituent can be selected from a group consisting of a first side-chain that includes a poly(alkylene oxide) moiety, a first side-chain that includes a cyclic carbonate moiety or a cross link that includes a poly(alkylene oxide) moiety and that cross links the disiloxane to a second siloxane wherein side chains are exclusive of cross links. As the number of substituents that include a poly(alkylene oxide) moiety and/or a cyclic carbonate moiety increase, the viscosity of an electrolyte can increase undesirably and/or the ionic conductivity of an electrolyte can decrease undesirably. As a result, embodiments of the disiloxane include no more than one poly(alkylene oxide) moiety and/or no more than one cyclic carbonate moiety. For instance, the entities linked to the first silicon and the second silicon, other than the first substituent, can each exclude a poly(alkylene oxide) moiety and/or a cyclic carbonate moiety. In some instances, the disiloxane excludes a poly(alkylene oxide) moieties or excludes cyclic carbonate moieties.

The second silicon can be linked to a second substituent selected from a group consisting of a second side-chain that includes a poly(alkylene oxide) moiety, a second side-chain that includes a cyclic carbonate moiety, an aryl group or an alkyl group. In some instances, the second substituent is selected from a group consisting of a second side-chain that includes a poly(alkylene oxide) moiety and a second side-chain that includes a cyclic carbonate moiety. As noted above, the viscosity of an electrolyte can increase undesirably and/or the ionic conductivity of an electrolyte can decrease undesirably as the number of substituents that include a poly(alkylene oxide) moiety and/or a cyclic carbonate moiety increases. As a result, the disiloxanes can include no more than two poly(alkylene oxide) moiety and/or no more than two cyclic carbonate moiety. For instance, the entities linked to the first silicon and the second silicon, in addition to the first substituent and the second substituent, can each exclude a poly(alkylene oxide) moiety and/or a cyclic carbonate moiety.

Examples of suitable disiloxanes are disclosed in U.S. Provisional Patent Application Ser. No. 60/543,951, filed on Feb. 11, 2004, entitled "Siloxane;" and in U.S. Provisional Patent Application Ser. No. 60/542,017, filed on Feb. 4, 2004, entitled "Nonaqueous Electrolyte Solvents for Electrochemical Devices;" and in U.S. Provisional Patent Application Ser. No. 60/543,898, filed on Feb. 11, 2004, entitled "Siloxane Based Electrolytes for Use in Electrochemical Devices;" and in U.S. patent application Ser. No. 10/971,507, filed on Oct. 21, 2004, entitled "Electrochemical Device Having Electrolyte Including Disiloxane;" each of which is incorporated herein in its entirety.

Formula VII provides an example of a suitable disiloxane. Formula VII:

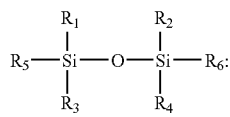

wherein $R_1$ is an alkyl group or an aryl group; $R_2$ is an alkyl group or an aryl group; $R_3$ is an alkyl group or an aryl group; $R_4$ is an alkyl group or an aryl group; $R_5$ is represented by Formula VII-A, Formula VII-B or Formula VII-C; $R_6$ is an alkyl group, an aryl group, represented by Formula VII-D, or represented by Formula VII-E.

Formula VII-A:

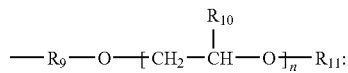

wherein $R_9$ is nil or a spacer; $R_{10}$ is hydrogen; alkyl or aryl; $R_{11}$ is alkyl or aryl; and n is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_9$ is represented by: —$(CH_2)_3$—.

Formula VII-B:

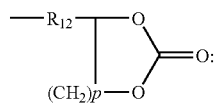

wherein $R_{12}$ is an organic spacer and p is 1 to 2. The spacer can be an organic spacer and can include one or more —$CH_2$— groups. Other suitable spacers can include an alkylene, alkylene oxide or a bivalent ether group. The above spacers can be substituted or unsubstituted. The above spacers can be completely or partially halogenated. For instance, the above spacers can be completely or partially fluorinated. In one example, $R_{12}$ is a bivalent ether moiety represented by: —$CH_2$—O—$(CH_2)_3$— with the —$(CH_2)_3$— linked to a silicon on the backbone of the disiloxane. In another example, $R_{12}$ is a alkylene oxide moiety represented by: —$CH_2$—O— with the oxygen linked to a silicon on the backbone of the disiloxane.

Formula VII-C:

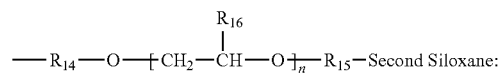

where $R_{14}$ is nil or a spacer; $R_{15}$ is nil or a spacer; $R_{16}$ is hydrogen, alkyl or aryl; second siloxane represents another siloxane and n is 1 to 12. The spacers can be organic spacers and can include one or more —$CH_2$— groups. Other suitable spacers can include an alkylene, alkylene oxide or a bivalent ether group. These spacers can be the same or different and can be substituted or unsubstituted. The above spacers can be completely or partially halogenated. For instance, the above spacers can be completely or partially fluorinated. In one example, $R_{14}$ and $R_{15}$ are each represented by: —$(CH_2)_3$—.

Formula VII-D:

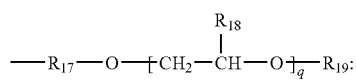

wherein $R_{17}$ is nil or a spacer; $R_{18}$ is hydrogen; alkyl or aryl; $R_{19}$ is alkyl or aryl; and q is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{17}$ is represented by: —$CH_2$—O—$(CH_2)_3$— with the —$(CH_2)_3$— linked to a silicon on the backbone of the disiloxane.

Formula VII-E:

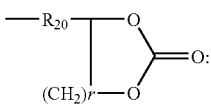

wherein $R_{20}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{20}$ is a bivalent ether moiety represented by: —$CH_2$—O—$(CH_2)_3$— with the —$(CH_2)_3$— linked to a silicon on the backbone of the disiloxane. In another example, $R_{20}$ is a alkylene oxide moiety represented by: —$CH_2$—O— with the oxygen linked to a silicon on the backbone of the disiloxane.

In the disiloxanes illustrated in Formula VII: $R_5$ can represent Formula VII-A or Formula VII-B; or $R_5$ can represent Formula VII-A or Formula VII-C; or $R_5$ can represent Formula VII-B or Formula VII-C. Additionally or alternately: $R_6$ can represent an alkyl group or an aryl group or Formula VII-D; $R_6$ can represent an alkyl group or an aryl group or Formula VII-E. In some instances, $R_1$, $R_2$, $R_3$ and $R_4$ are each an alkyl group. For instance, $R_1$, $R_2$, $R_3$ and $R_4$ can each be a methyl group.

In one example of the disiloxane, the first substituent is a side chain that includes a poly(alkylene oxide) moiety. The poly(alkylene oxide) moiety can include an oxygen linked directly to the first silicon. For instance, the disiloxanes can be represented by Formula VII with $R_5$ represented by Formula VII-A and $R_9$ as nil. Alternately, a spacer can link the poly (alkylene oxide) moiety to the first silicon. For instance, the disiloxanes can be represented by Formula VII with $R_5$ represented by Formula VII-A and $R_9$ as a divalent organic moiety.

When the first substituent is a side chain that includes a poly(alkylene oxide) moiety, each of the entities linked to the second silicon can be alkyl groups and/or aryl groups. For instance, the second substituent can be an alkyl group or an aryl group. The disiloxanes can be represented by Formula VII with $R_5$ represented by Formula VII-A and $R_6$ as an alkyl group or an aryl group. Formula VII-F provides an example of the disiloxane. Formula VII-F:

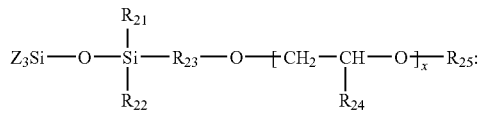

where $R_{21}$ is an alkyl group or an aryl group; $R_{22}$ is an alkyl group or an aryl group; $R_{23}$ is nil or a spacer; $R_{24}$ is a hydrogen atom or an alkyl group; $R_{25}$ is an alkyl group; Z is an alkyl or an aryl group and the Zs can be the same or different and x is from 1 to 30. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{23}$ has a structure according to: —$(CH_2)_3$—. In another example, the Zs, $R_{21}$, $R_{22}$ and $R_{25}$ are each a methyl group. In a preferred example, the Zs, $R_{21}$, $R_{22}$ and $R_{25}$ are each a methyl group, $R_{23}$ has a structure according to: —$(CH_2)_3$— and $R_{24}$ is a hydrogen. In a more preferred example, the Zs, $R_{21}$, $R_{22}$ and $R_{25}$ are each a methyl group, $R_{23}$ has a structure according to: —$(CH_2)_3$—; $R_{24}$ is a hydrogen; and x is 3. A preferred example of the disiloxane is provided in the following Formula VII-G:

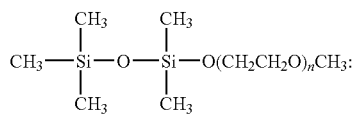

wherein n is 1 to 12. A particularly preferred disiloxane is represented by Formula VII-G with n=3.

When the first substituent is a side chain that includes a poly(alkylene oxide) moiety, the second substituent can be a side chain that includes a poly(alkylene oxide) moiety. For instance, the disiloxane can be represented by Formula VII with $R_5$ represented by Formula VII-A and $R_6$ represented by Formula VII-D. An example of the disiloxanes is provided in the following Formula VII-H:

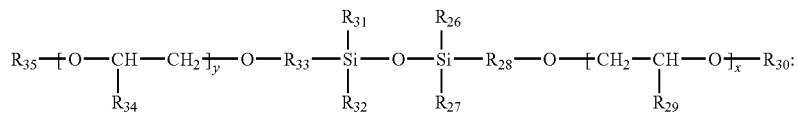

wherein $R_{26}$ is an alkyl group or an aryl group; $R_{27}$ is an alkyl group or an aryl group; $R_{28}$ is nil or a spacer; $R_{29}$ is a hydrogen atom or an alkyl group; $R_{30}$ is an alkyl group; $R_{31}$ is an alkyl group or an aryl group; $R_{32}$ is an alkyl group or an aryl group; $R_{33}$ is nil or a spacer; $R_{34}$ is a hydrogen atom or an alkyl group; $R_{35}$ is an alkyl group; x is from 1 to 30 and y is from 1 to 30. $R_{28}$ and $R_{33}$ can be the same or different. Each spacer can be an organic spacer and can include one or more —$CH_2$— groups. Other suitable spacers can include an alkylene, alkylene oxide or bivalent ether. These spacers can be substituted or unsubstituted. The above spacers can be completely or partially halogenated. For instance, the above spacers can be completely or partially fluorinated. In one example, $R_{28}$ and $R_{33}$ each has a structure according to: —$(CH_2)_3$—. In another example, $R_{26}$, $R_{27}$, $R_{31}$, and $R_{32}$ are each an alkyl group. In another example, $R_{26}$, $R_{27}$, $R_{30}$, $R_{31}$, $R_{32}$, and $R_{35}$ are each a methyl group. In another example, $R_{30}$ and $R_{35}$ have the same structure, $R_{29}$ and $R_{34}$ have the same structure, $R_{28}$ and $R_{33}$ have the same structure and $R_{26}$, $R_{27}$, $R_{31}$, and $R_{32}$ have the same structure. A preferred example of the disiloxane is presented in Formula VII-J:

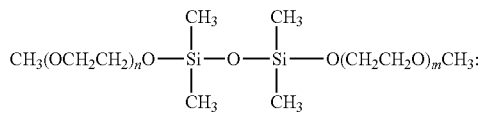

wherein n is 1 to 12 and m is 1 to 12. A particularly preferred disiloxane is represented by Formula VII-J with n=3 and m=3.

When the first substituent is a side chain that includes a poly(alkylene oxide) moiety, the second substituent can be a side chain that includes a cyclic carbonate moiety. For instance, the disiloxane can be represented by Formula VII with $R_5$ represented by Formula VII-A and $R_6$ represented by Formula VII-E.

In another example of the disiloxane, the first substituent cross links the disiloxane to a second siloxane and includes a poly(alkylene oxide) moiety. The poly(alkylene oxide) moiety can include an oxygen linked directly to the first silicon. For instance, the disiloxane can be represented by Formula VII with $R_5$ represented by Formula VII-C and $R_{14}$ as nil. In some instances, the poly(alkylene oxide) moiety also includes a second oxygen liked directly to the backbone of the second siloxane. For instance, the disiloxane can be represented by Formula VII with $R_5$ represented by Formula VII-C, $R_{14}$ as nil, and $R_{15}$ as nil. Alternately, a spacer can link the poly(alkylene oxide) moiety to the first silicon. For instance, the disiloxanes can be represented by Formula VII with $R_5$ represented by Formula VII-A and $R_{14}$ as a divalent organic moiety. In some instances, the poly(alkylene oxide) moiety also includes a second spacer linking the poly(alkylene oxide) moiety to the backbone of the second siloxane. For instance, the disiloxane can be represented by Formula VII with $R_5$ represented by Formula VII-C, $R_{14}$ as a divalent organic moiety, and $R_{15}$ as a divalent organic moiety.

When the first substituent cross links the disiloxane to a second siloxane and includes a poly(alkylene oxide) moiety, each of the entities linked to the second silicon can be an aryl group or an alkyl group. For instance, the second substituent can be an alkyl group or an aryl group. The disiloxanes can be represented by Formula VII with $R_5$ represented by Formula VII-C and $R_6$ as an alkyl group or an aryl group. Formula VII-K provides an example of the disiloxane where the poly(alkylene oxide) moiety includes an oxygen linked directly to the first silicon. Formula VII-K:

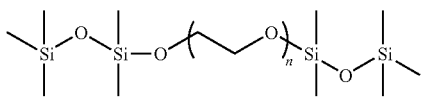

wherein n is 1 to 12. Formula VII-L provides an example of the disiloxane where an organic spacer is positioned between the poly(alkylene oxide) moiety and the first silicon. Formula VII-L:

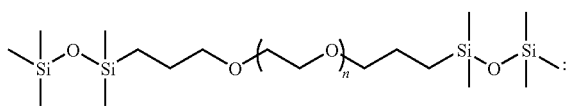

wherein n is 1 to 12.

When the first substituent cross links the disiloxane to a second siloxane and includes a poly(alkylene oxide) moiety, the second substituent can be a side chain that includes a poly(alkylene oxide) moiety. For instance, the disiloxanes can be represented by Formula VII with $R_5$ represented by Formula VII-C and $R_6$ represented by Formula VII-D.

When the first substituent cross links the disiloxane to a second siloxane and includes a poly(alkylene oxide) moiety, the second substituent can be a side chain that includes a cyclic carbonate moiety. For instance, the disiloxanes can be represented by Formula VII with $R_5$ represented by Formula VII-C and $R_6$ represented by Formula VII-E.

In another example of the disiloxane, the first substituent is a side chain that includes a cyclic carbonate moiety. For instance, the disiloxane can be represented by Formula VII with $R_5$ represented by Formula VII-B.

When the first substituent is a side chain that includes a cyclic carbonate moiety, each of the entities linked to the second silicon can be an aryl group or an alkyl group. For instance, the second substituent can be an alkyl group or an aryl group. The disiloxane can be represented by Formula VII with $R_5$ represented by Formula VII-B and with $R_6$ as an alkyl group or an aryl group. A preferred example of the disiloxane is presented by the following Formula VII-M:

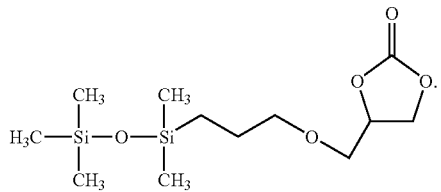

When the first substituent is a side chain that includes a cyclic carbonate moiety, the second substituent can be a side chain that includes a cyclic carbonate moiety. For instance, the disiloxane can be represented by Formula VII with $R_5$ represented by Formula VII-B and $R_6$ represented by Formula VII-E. The structure of the first substituent can be the same as the structure of the second substituent or can be different from the structure of the second substituent. A preferred example of the disiloxane is presented by the following Formula VII-N:

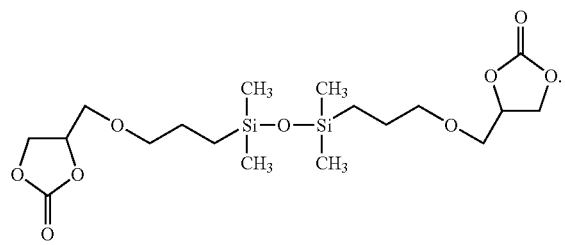

The electrolyte can include a single disiloxane and none or more other siloxanes. Alternately, the electrolyte can include two or more disiloxanes and none or more other siloxanes. Examples of other suitable siloxanes include, but are not limited to, disiloxanes, trisiloxanes, tetrasiloxanes, pentasiloxanes, oligosiloxanes or polysiloxanes. Suitable disiloxanes are disclosed in U.S. patent application Ser. No. 10/971,507, filed on Oct. 21, 2004, entitled "Electrochemical Device Having Electrolyte Including Disiloxane" and incorporated herein in its entirety. Suitable trisiloxanes are disclosed in U.S. patent application Ser. No. 10/971,913, filed on Oct. 21, 2004, entitled "Electrochemical Device Having Electrolyte Including Trisiloxane" and incorporated herein in its entirety. Suitable tetrasiloxanes are disclosed in U.S. patent application Ser. No. 10/971,926, filed on Oct. 21, 2004, entitled "Electrochemical Device Having Electrolyte Including Tetrasiloxane" and incorporated herein in its entirety. Other suitable disiloxanes, trisiloxanes, and tetrasiloxanes are disclosed in U.S. Provisional Patent Application Ser. No. 60/543,951, filed on Feb. 11, 2004, entitled "Siloxane," and incorporated herein in its entirety; and U.S. Provisional Patent Application Ser. No. 60/542,017, filed on Feb. 4, 2004, entitled "Nonaqueous Electrolyte Solvents for Electrochemical Devices," and incorporated herein in its entirety; and U.S. Provisional Patent Application Ser. No. 60/543,898, filed on Feb. 11, 2004, entitled "Siloxane Based Electrolytes for Use in Electrochemical Devices," and incorporated herein in its entirety. In some instances, at least one of the two or more disiloxanes is chosen from those represented by Formula VII through Formula VII-N. Alternately, each of the disiloxanes can be chosen from those represented by Formula VII through Formula VII-N.

The solvent can include or consist of one or more silanes. An example of the silane includes a silicon linked to one or more first substituents that each include a poly(alkylene oxide) moiety or a cyclic carbonate moiety. When a first substituent includes a poly(alkylene oxide) moiety, the poly(alkylene oxide) moiety can include an oxygen linked directly to the silicon. Alternately, the first substituent can include a spacer positioned between the poly(alkylene oxide) moiety and the silicon. Suitable spacers include, but are not limited to, organic spacers. In some instances, the poly(alkylene oxide) moiety is a poly(ethylene oxide) moiety. In some instances, the poly(alkylene oxide) moiety is an oligo(alkylene oxide) moiety having from 1 to 15 alkylene oxide units. Examples of suitable silanes are disclosed in U.S. patent application Ser. No. 10/977,313, filed on Oct. 28, 2004, entitled "Electrolyte Including Silane for Use in Electrochemical Devices;" which claims priority to U.S. Provisional Patent Application Ser. No. 60/601,452, filed on Aug. 13, 2004, entitled "Electrolyte Including Silane for Use in Electrochemical Devices;" each of which is incorporated herein in its entirety.

The silane can include only one of the first substituents linked to a silicon or a plurality of the first substituents linked to the silicon. When the silane includes a plurality of the first substituents, the silane can include two of the first substituents, three of the first substituents or four of the first substituents. When the silane includes fewer than four first substituents, the additional substituent(s) linked to the silicon are second substituents that each exclude a poly(alkylene oxide) moiety and a cyclic carbonate moiety. Suitable second substituents include, but are not limited to, alkyl groups, aryl groups and halogens. When the silane includes a plurality of first substituents, the first substituents can each be the same or can be different. In one example, the silane includes a plurality of the first substituents and each of the first substituents is different. Alternately, the silane includes a plurality of the first substituents and a portion of the first substituents is different from another portion of the first substituents.

Examples of the first substituents include: a side-chain that includes a poly(alkylene oxide) moiety; a side-chain that includes a cyclic carbonate moiety; and a cross link that includes a poly(alkylene oxide) moiety and that cross-links the silane to a second silane where a cross link is exclusive of a side chain. Accordingly, the silane can include one or more side-chains that each include a poly(alkylene oxide) moiety and/or one or more side-chains that each include a cyclic carbonate moiety and/or one or more cross links that each include a poly(alkylene oxide) moiety and that each cross-link the silane to a second silane.

In one example, the silane includes a silicon linked to one or more side-chains that each include a poly(alkylene oxide) moiety and linked to one or more second substituents. In another example, the silane includes a silicon linked to one or more side-chains that each include a cyclic carbonate moiety and linked to one or more second substituents. In another example, the silane includes a silicon linked to one or more cross links that each include a poly(alkylene oxide) moiety and linked to one or more second substituents.

In an example, the silane includes a silicon linked to one or more side-chains that each include a poly(alkylene oxide) moiety; to one or more side-chains that each include a cyclic carbonate moiety; and to one or more second substituents. In another example, the silane includes a silicon linked to one or more side-chains that each include a cyclic carbonate moiety; to one or more cross links that each include a poly(alkylene oxide) moiety; and to one or more second substituents. In another example, the silane includes a silicon linked to one or more side-chains that each include a poly(alkylene oxide) moiety; to one or more cross links that each include a poly(alkylene oxide) moiety; and to one or more second substituents.

In one example, the silane includes a silicon linked to four side-chains that each include a poly(alkylene oxide) moiety. Accordingly, the silane can exclude cyclic carbonate moieties. In another example, the silane includes a silicon linked to four side-chains that each include a cyclic carbonate moiety. Accordingly, the silane can exclude poly(alkylene oxide) moieties. In another example, the silane includes a silicon linked to four cross links that each include a poly(alkylene oxide) moiety.

An example of the silane includes a silicon linked to one or more first substituents that each include a poly(alkylene oxide) moiety or a cyclic carbonate moiety. When a first substituent includes a poly(alkylene oxide) moiety, the poly(alkylene oxide) moiety can include an oxygen linked directly to the silicon. Alternately, the first substituent can include a spacer positioned between the poly(alkylene oxide) moiety and the silicon. Suitable spacers include, but are not limited to, organic spacers. In some instances, the poly(alkylene oxide) moiety is a poly(ethylene oxide) moiety. In some instances, the poly(alkylene oxide) moiety is an oligo(alkylene oxide) moiety having from 1 to 15 alkylene oxide units.

The silane can include only one of the first substituents linked to a silicon or a plurality of the first substituents linked to the silicon. When the silane includes a plurality of the first substituents, the silane can include two of the first substituents, three of the first substituents or four of the first substituents. When the silane includes fewer than four first substituents, the additional substituent(s) linked to the silicon are second substituents that each exclude a poly(alkylene oxide) moiety and a cyclic carbonate moiety. Suitable second substituents include, but are not limited to, alkyl groups, aryl groups and halogens. When the silane includes a plurality of first substituents, the first substituents can each be the same or can be different. In one example, the silane includes a plurality of the first substituents and each of the first substituents is different. Alternately, the silane includes a plurality of the first substituents and a portion of the first substituents is different from another portion of the first substituents.

Examples of the first substituents include: a side-chain that includes a poly(alkylene oxide) moiety; a side-chain that includes a cyclic carbonate moiety; and a cross link that includes a poly(alkylene oxide) moiety and that cross-links the silane to a second silane where a cross link is exclusive of a side chain. Accordingly, the silane can include one or more side-chains that each include a poly(alkylene oxide) moiety and/or one or more side-chains that each include a cyclic carbonate moiety and/or one or more cross links that each include a poly(alkylene oxide) moiety and that each cross-link the silane to a second silane.

In one example, the silane includes a silicon linked to one or more side-chains that each include a poly(alkylene oxide) moiety and linked to one or more second substituents. In another example, the silane includes a silicon linked to one or more side-chains that each include a cyclic carbonate moiety and linked to one or more second substituents. In another example, the silane includes a silicon linked to one or more cross links that each include a poly(alkylene oxide) moiety and linked to one or more second substituents.

In an example, the silane includes a silicon linked to one or more side-chains that each include a poly(alkylene oxide) moiety; to one or more side-chains that each include a cyclic carbonate moiety; and to one or more second substituents. In another example, the silane includes a silicon linked to one or more side-chains that each include a cyclic carbonate moiety; to one or more cross links that each include a poly(alkylene oxide) moiety; and to one or more second substituents. In another example, the silane includes a silicon linked to one or more side-chains that each include a poly(alkylene oxide) moiety; to one or more cross links that each include a poly(alkylene oxide) moiety; and to one or more second substituents.

In one example, the silane includes a silicon linked to four side-chains that each include a poly(alkylene oxide) moiety. Accordingly, the silane can exclude cyclic carbonate moieties. In another example, the silane includes a silicon linked to four side-chains that each include a cyclic carbonate moiety. Accordingly, the silane can exclude poly(alkylene oxide) moieties. In another example, the silane includes a silicon linked to four cross links that each include a poly(alkylene oxide) moiety.

A suitable silane can be represented by the following Formula VIII: $SiR_{4-x-y}R'_xR''_y$; wherein R is a second substituent and an alkyl group, an aryl group or a halogen, $R'_x$ is a first substituent that includes a poly(alkylene oxide) moiety and can be represented by Formula VIII-A or Formula VIII-C, $R''_y$ is a first substituent that includes a cyclic carbonate moiety and can be represented by Formula VIII-B, x indicates the number of R' substituents included in the silane and is 0 to 4, y indicates the number of R" substituents included in the silane is 0 to 4,4-x-y indicates the number of R substituents, and x+y is at least 1.

Formula VIII-A:

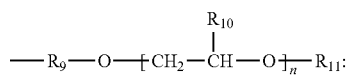

wherein $R_9$ is nil or an organic spacer; $R_{10}$ is hydrogen; alkyl or aryl; $R_{11}$ is alkyl or aryl; and n is 1 to 15. The spacer can be an organic spacer and can include one or more $—CH_2—$ groups. Other suitable spacers can include an alkylene, alkylene oxide or a bivalent ether group. These spacers can be substituted or unsubstituted. In one example, $R_9$ is represented by: $—(CH_2)_3—$.

Formula VIII-B:

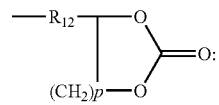

wherein $R_{12}$ is an organic spacer and p is 1 to 2. The spacer can be an organic spacer and can include one or more $—CH_2—$ groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{12}$ is a bivalent ether moiety represented by: $—CH_2—O—(CH_2)_3—$ with the $—(CH_2)_3—$ linked to a silicon on the backbone of the silane. In another example, $R_{12}$ is an alkylene oxide moiety represented by: $—CH_2—O—$ with the oxygen linked to a silicon on the backbone of the silane.

Formula VIII-C:

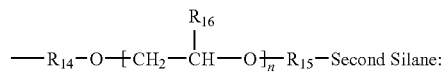

where $R_{14}$ is nil or a spacer; $R_{15}$ is nil or a spacer; $R_{16}$ is hydrogen, alkyl or aryl; second silane represents another silane and n is 1 to 15. The spacers can be organic spacers and can include one or more $—CH_2—$ groups. Other suitable spacers can include an alkylene, alkylene oxide or a bivalent ether group. These spacers can be the same or different and can be substituted or unsubstituted. In one example, $R_{14}$ and $R_{15}$ are each represented by: $—(CH_2)_3—$. The second silane can be represented by: $—SiR_{3-p-q}R'_pR''_q$, wherein R are each an alkyl group or an aryl group, R' is a substituent that includes a poly(alkylene oxide) moiety and can be represented by Formula VIII-A or Formula VIII-C, R" is a substituent that includes a cyclic carbonate moiety and can be represented by Formula VIII-B, p is the number of R' substituents included on the second silane and is 0 to 3, q is the number of R" substituents included on the second silane, 3-p-q is the number of R substituents, and is 0 to 3. In one example, p is 0 and q is 0. In another example, p+q is greater than or equal to 1. In yet another example, p is greater than or equal to 1. In still another example, q is greater than or equal to 1. In another example, R' is represented by Formula VIII-A and R" is represented by Formula VIII-B, p is 0 to 3 and q is 0 to 3.

One or more of the alkyl and aryl groups specified in Formula VIII through Formula VIII-C can be substituted, unsubstituted, halogenated, and/or fluorinated. When the silane includes more than one substituent represented by Formula VIII-A, the entities can be the same or different. When the silane includes more than one substituent represented by Formula VIII-B, the entities can be the same or different. When the silane includes more than one substituent represented by Formula VIII-C, the entities can be the same or different.

In one example of the silane according to Formula VIII, x=0. In another example, x is 1 to 3. In another example, y=0. In still another example, y is 1 to 3. In another example, x+y=4 or x+y=2.

In some instances, R' is represented by Formula VIII-A, x is greater than 0, and $R_9$ is nil. In other instances, R' is represented by Formula VIII-A and $R_9$ is an organic spacer. In an example, R" is represented by Formula VIII-B and y is greater than 0. In another example, R' is represented by Formula VIII-C, x is greater than 0, $R_{14}$ is nil and $R_{15}$ is nil. In still another example, R' is represented by Formula VIII-C, x is greater than 0, $R_{14}$ is an organic spacer and $R_{15}$ is an organic spacer.

When the silane includes more than one substituent represented by Formula VIII-A, the entities can be the same or different. When the silane includes more than one substituent represented by Formula VIII-B, the entities can be the same or different. When the silane includes more than one substituent represented by formula VIII-C, the entities can be the same or different.

A preferred silane includes a silicon linked to one side chain that includes a poly(alkylene oxide) moiety and linked to three second substituents. For instance, the silane can be represented by Formula VIII with x=1, y=0 and the R' represented by Formula VIII-A. Formula VIII-D presents an example of the silane that includes a silicon linked to one side chain that includes a poly(ethylene oxide) moiety, and linked to three alkyl groups. The poly(ethylene oxide) moiety of Formula VIII-D includes an oxygen liked directly to the silicon. Formula VIII-D:

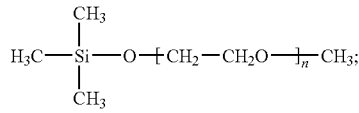

wherein n is 1 to 15. In a preferred silane according to Formula VIII-D, n=3. Formula VIII-E presents an example of the silane that includes a silicon linked to one side chain that includes a poly(alkylene oxide) moiety, and linked to three alkyl groups. The side chain of Formula VIII-E includes an organic spacer positioned between the silicon and the poly(ethylene oxide) moiety. Formula VIII-E:

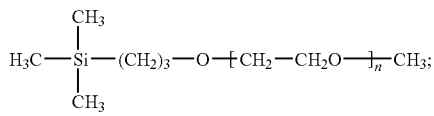

wherein n is 1 to 15. In a preferred silane according to Formula VIII-E, n=3. Formula VIII-F presents another example of the silane that includes a silicon linked to one side chain that includes a poly(alkylene oxide) moiety, and linked to three alkyl groups. The side chain of Formula VIII-F includes an organic spacer positioned between the silicon and the poly(alkylene oxide) moiety. Formula VIII-F:

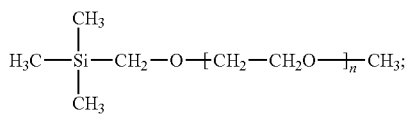

wherein n is 1 to 15. In a preferred silane according to Formula VIII-F, n=3.

A preferred silane includes a silicon linked to two side chains that each include a poly(alkylene oxide) moiety and linked to two second substituents. For instance, the silane can be represented by Formula VIII with x=2 and y=0. One or both R' can be represented by Formula VIII-A. One or both R' can be represented by Formula VIII-C. In some instances, one R' is represented by Formula VIII-A and one R' is represented by Formula VIII-C. Formula VIII-G is an example of the silane that includes a silicon linked to two side chains that each include a poly(ethylene oxide) moiety and linked to two alkyl groups. Formula VIII-G:

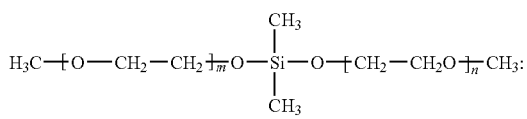

wherein m is 1 to 15, n is 1 to 15 and m can be different from n or the same as n. In a preferred silane according to Formula VIII-G, m=3 and n=3. Formula VIII-H is an example of the silane that includes a silicon linked to two side chains that each include a poly(ethylene oxide) moiety, and linked to an alkyl group, and linked to an aryl group.

Formula VIII-H:

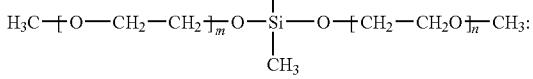

wherein m is 1 to 15, n is 1 to 15 and m can be different from n or the same as n. In a preferred silane according to Formula VIII-H, m=3 and n=3.

Another preferred silane includes a silicon linked to one side chain that includes a cyclic carbonate moiety and linked to three second substituents. For instance, the silane can be represented by Formula VIII with x=0 and y=1. Formula VIII-J is a preferred example of the silane that includes a silicon linked to a side chain that includes a cyclic carbonate moiety and linked to three alkyl groups. Formula VIII-J:

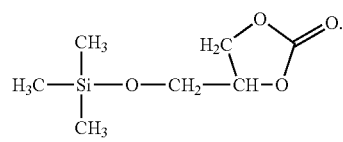

Formula VIII-K is another example of the silane that includes a silicon linked to a side chain that includes a cyclic carbonate moiety and linked to three alkyl groups. Formula VIII-K:

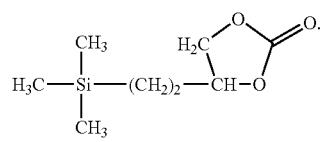

Another preferred silane includes a silicon linked to a cross link that includes a poly(alkylene oxide) moiety and linked to three second substituents. For instance, the silane can be represented by Formula VIII with x=1, y=0 and the R' represented by Formula VIII-C. Formula VIII-L is a preferred example of the silane that includes a silicon linked to a cross link that includes a poly(alkylene oxide) moiety and linked to three alkyl groups. The poly(alkylene oxide) moiety of Formula VIII-L includes an oxygen liked directly to the silicon of each silane. Formula VIII-L:

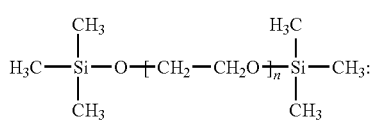

wherein n is 1 to 15. In a preferred silane according to Formula VIII-L, n=4.

The electrolyte can include a single silane. Alternately, the electrolyte can include a plurality of silanes. When the electrolyte includes a plurality of silanes, at least one of the silanes can be chosen from those represented by Formula VIII through Formula VIII-L. Alternately, each of the silanes can be chosen from those represented by Formula VIII through Formula VIII-L. In some instances, the electrolyte includes a silane that excludes poly(alkylene oxide) moieties and a silane that excludes cyclic carbonate moieties. For instance, the electrolyte can include a silane that includes one or more poly(alkylene oxide) moieties and a silane that excludes poly (alkylene oxide) moieties moieties. Alternately, the electrolyte can include a silane that includes one or more cyclic carbonate moieties and a silane that excludes cyclic carbonate moieties. In a preferred example, the electrolyte includes a blend of a silane according to Formula VIII-J and a silane according to Formula VIII-F. In another preferred example, the electrolyte includes a blend of a silane according to Formula VIII-J and a silane according to Formula VIII-D.

In some instances, the solvent includes more than one of the siloxanes or more than one of the silanes. Further, the solvent can include one or more siloxanes combined with one or more silanes. The combination of a silane with other silanes and/or with other siloxanes can reduce the viscosity of the blended solvent. Additionally, the inventors believe that the silanes can improve the mobility of poly(alkylene oxide) in other siloxanes or silanes. Additionally, the combination of a silane with other silanes and/or siloxanes can increase the ability of the solvent to dissociate the salts employed in electrolyte and can accordingly increase the concentration of free ions in the electrolyte. These features can further enhance the ionic conductivity of the electrolytes.

The above siloxanes and silanes can be generated by employing nucleophilic substitutions, hydrosilylation and/or dehydrogenation reactions. Methods for generating the silanes and siloxanes can be found in U.S. patent application Ser. No. 10/810,019, filed on Mar. 25, 2004, entitled "Polysiloxane for Use in Electrochemical Cells;" U.S. Provisional Patent Application Ser. No. 60/543,951, filed on Feb. 11, 2004, entitled "Siloxane;" U.S. Provisional Patent Application Ser. No. 60/542,017, filed on Feb. 4, 2004, entitled "Nonaqueous Electrolyte Solvents for Electrochemical Devices;" and U.S. Provisional Patent Application Ser. No. 60/543,898, filed on Feb. 11, 2004, entitled "Siloxane Based Electrolytes for Use in Electrochemical Devices;" U.S. Provisional Patent Application Ser. No. 60/601,452, filed on Aug. 13, 2004, entitled "Electrolyte Including Silane for Use in Electrochemical Devices;" U.S. patent application Ser. No. 10/971,507, filed on Oct. 21, 2004, entitled "Electrochemical Device Having Electrolyte Including Disiloxane;" and U.S. patent application Ser. No. 10/971,913, filed on Oct. 21, 2004, entitled "Electrochemical Device Having Electrolyte Including Trisiloxane;" and U.S. patent application Ser. No. 10/971,926, filed on Oct. 21, 2004, entitled "Electrochemical Device Having Electrolyte Including Tetrasiloxane;" each of which is incorporated herein in its entirety.

In some instances, the solvent includes one or more organic solvents in addition to the one or more of the silanes and/or in addition to the one or more of the siloxanes. Alternately, the solvent can include one or more organic solvents instead of the one or more of the silanes and/or instead of the one or more of the siloxanes. Organic solvents can reduce the viscosity of the siloxanes and/or the silanes. Additionally or alternately, the addition of organic salts can increase the ionic conductivity of the electrolyte. Examples of suitable organic solvents include, but are not limited to, cyclic carbonates such as propylene carbonate (PC), ethylene carbonate (EC), butylene carbonate (BC) and vinylene carbonate (VC), linear carbonates such as dimethyl carbonate (DMC), diethyl carbonate (DEC), ethylmethyl carbonate (EMC) and dipropyl carbonate (DPC), dialkyl carbonates such as diglyme, triglyme, tetragylme, 1,2-dimethoxyethane (DME), methyl propyl carbonate, ethyl propyl carbonate, aliphatic carboxylate esters such as methyl formate, methyl acetate and ethyl propionate, gamma.-lactones such as .gamma.-butyrolactone, linear ethers such as 1,2-ethoxyethane (DEE) and ethoxymethoxyethane (EME), cyclic ethers such as tetrahydrofuran and 2-methyltetrahydrofuran, and aprotic organic solvents such as dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-dimethyl-2-imidazoline, 3-methyl-2-oxazolidinone, propylene carbonate-derivatives, tetrahydrofuran-derivatives, ethylether, 1,3-propanesultone, anisole, N-methylpyrrolidone and fluorinated carboxylate esters. In some instances, the solvent excludes organic solvents. In some instances, the solvent excludes siloxanes and silanes. When the solvent includes one or more organic solvents a suitable volume ratio of the total organic solvents to the total siloxane and silane is greater than 1:99, 1:9, or 3:7 and/or less than 9:1, 4:1 or 7:3.

The electrolyte can optionally include one or more additives that form a passivation layer on the anode. The additives can be reduced and/or polymerize at the surface of the anode to form the passivation layer. Vinyl ethylene carbonate (VEC) and vinyl carbonate (VC) are examples of additives that can form a passivation layer by being reduced and polymerizing to form a passivation layer. When they see an electron at the surface of a carbonaceous anode, they are reduced to $Li_2CO_3$ and butadiene that polymerizes at the surface of the anode. Ethylene sulfite (ES) and propylene sulfite (PS) form passivation layers by mechanisms that are similar to VC and VEC. In some instances, one or more of the additives has a reduction potential that exceeds the reduction potential of the components of the solvent. For instance, VEC and VC have a reduction potential of about 2.3V vs. $Li/Li^+$. This arrangement of reduction potentials can encourage the additive to form the passivation layer before reduction of other electrolyte components and can accordingly reduce consumption of other electrolyte components.

Suitable additives include, but are not limited to, carbonates having one or more unsaturated substituents. For instance, suitable additives include unsaturated and unsubstituted cyclic carbonates such as vinyl carbonate (VC); cyclic alkylene carbonates having one or more unsaturated substituents such as vinyl ethylene carbonate (VEC), and o-phenylene carbonate (CC, $C_7H_4O_3$); cyclic alkylene carbonates having one or more halogenated alkyl substituents such as ethylene carbonate substituted with a trifluormethyl group (trifluoropropylene carbonate, TFPC); linear carbonates having one or more unsaturated substituents such as ethyl 2-propenyl ethyl carbonate ($C_2H_5CO_3C_3H_5$); saturated or unsaturated halogenated cyclic alkylene carbonates such as fluoroethylene carbonate (FEC) and chloroethylene carbonate (ClEC). Other suitable additives include, acetates having one or more unsaturated substituents such as vinyl acetate (VA). Other suitable additives include cyclic alkyl sulfites and linear sulfites. For instance, suitable additives include unsubstituted cyclic alkyl sulfites such as ethylene sulfite (ES); substituted cyclic alkylene sulfites such as ethylene sulfite substituted with an alkyl group such as a methyl group (propylene sulfite, PS); linear sulfites having one or more one more alkyl substituents and dialkyl sulfites such as dimethyl sulfite (DMS) and diethyl sulfite (DES). Other suitable additives include halogenated-gamma-butyrolactones such as bromo-gamma-butyrolactone (BrGBL) and fluoro-gamma-butyrolactone (FGBL).

The additives can include or consist of one or more additives selected from the group consisting of: dimethyl sulfite (DMS), diethyl sulfite (DES), bromo-gamma-butyrolactone (BrGBL), fluoro-gamma-butyrolactone (FGBL), vinyl carbonate (VC), vinyl ethylene carbonate (VEC), ethylene sulfite (ES), CC, trifluoropropylene carbonate (TFPC), 2-propenyl ethyl carbonate, fluoroethylene carbonate (FEC), chloroethylene carbonate (ClEC), vinyl acetate (VA), propylene sulfite (PS), 1,3 dimethyl butadiene, styrene carbonate, phenyl ethylene carbonate (PhEC), aromatic carbonates, vinyl pyrrole, vinyl piperazine, vinyl piperidine, vinyl pyridine, and mixtures thereof. In another example, the electrolyte includes or consists of one or more additives selected from the group consisting of vinyl carbonate (VC), vinyl ethylene carbonate (VEC), ethylene sulfite (ES), propylene sulfite (PS), and phenyl ethylene carbonate (PhEC). In a preferred example, the electrolyte includes or consists of one or more additives selected from the group consisting of vinyl carbonate (VC), vinyl ethylene carbonate (VEC), ethylene sulfite (ES), and propylene sulfite (PS). In another preferred example, the electrolyte includes vinyl carbonate (VC) and/or vinyl ethylene carbonate (VEC).

In some conditions, certain organoborate salts, such as LiDfOB, can form a passivation layer. As a result, the desirability and/or concentration of additives may be reduced when organoborate are employed as salts. In some instances, the concentration of additives in the electrolyte generally does not greatly exceed the concentration needed to form the passivation layer. As a result, the additives are generally present in smaller concentrations than salts. A suitable concentration for an additive in the electrolyte includes, but is not limited to, concentrations greater than 0.1 wt %, greater than 0.5 wt % and/or less than 5 wt %, less than 20 wt %, or less than 35 wt % where each of the wt % refers to the percentage of the total weight of solvent plus additive. In a preferred embodiment, the concentration of the additive is less than 3 wt % or less than 2 wt %.

The electrolyte can be a liquid. In some instances, the electrolyte is a solid or a gel. For instance, the electrolyte can include a network polymer that interacts with the solvent to form an interpenetrating network. The interpenetrating network can serve as a mechanism for providing a solid electrolyte or gel electrolyte. Alternately, the electrolyte can include one or more solid polymers that are each a solid at room temperature when standing alone. The solid polymer can be employed in conjunction with the solvent to generate an electrolyte such as a plasticized electrolyte as a solid or as a gel. Alternately, one or more silanes and/or one or more siloxanes in the solvent can be cross linked to provide a solid or gel electrolyte. A polysiloxane is an example of a cross-linkable solvent. Suitable examples for method of forming a cross linked polymer are disclosed in U.S. patent application Ser. No. 10/810,019, filed on Mar. 25, 2004, entitled "Polysiloxane for Use in Electrochemical Cells" and incorporated herein in its entirety. An electrolyte can be present before cross linking and/or polymerizing the components of a solid or gel electrolyte and in the final electrolyte. The zeolite can work to remove impurities and/or as a solid support for the polymerization and/or cross linking of the components.

The battery can be a primary battery or a secondary battery. Further, the above cathode, anode and electrolyte combinations can be employed in other electrochemical devices such as capacitors and hybrid capacitors/batteries.

Example 1

A variety of 2032 type button cells were generated having a structure according to FIG. 1. The button cells include a separator 3 positioned between a cathode 1 and an anode 2. The anode and cathode are positioned in a chamber defined by a case 8, a gasket 9 and a cover 10. A spacer 11 and a spring washer 8 are positioned between the anode 2 and the case 8. The spacer 11 and spring washer 12 were made of stainless steel. The separator was a 25 μm thick polyethylene porous membrane (Tonen Co., Ltd.). An electrolyte positioned between the case 4 and the cover 6 activates the anode and the cathode.

The cathodes were generated by mixing 42 g $LiNi_{0.8}Co_{0.15}Al_{0.05}O_2$ (Toda Kogyo Co., Ltd., CA1050N) with 33.3 g of 12 wt %-solution of PVdF in n-methylpyrolidone (NMP) (Kureha Co., Ltd., PVdF1120), 2 g acetylene black and 2 g graphite (Timcal Co., Ltd., SFG6) in a mixer. The above mixture was coated on 20 um thick of aluminum foil substrate with a doctor blade. The result was dried in an oven preset at 80° C. and pressed down to a 105 μm thickness using a roll press. Cathodes 14 mm in diameter were punched out of the result.

The anodes were generated by mixing 46.56 g Mesocarbon Microbeads (Osaka Gas Co., Ltd., MCMB 25-28) and 1.44 g vapor grown carbon fiber (Showa denko Co., Ltd. VGCF,) with 41.03 g of a 13 wt % solution of PVdF in NMP (Kureha Co., Ltd., PVdF9130) in a mixer. The result was coated onto a 10 um thickness of copper foil with a doctor blade. The result was dried in an oven preset at 80° C. The dried result was then pressed to a 65 μm thickness. Anodes (15 mm in diameter) were punched out of the result.

A disiloxane was generated with a structure according o Formula VII-J with n=3 and m=3. A first electrolyte was generated by dissolving LiBOB to 1.0 M in the disiloxane.

A second electrolyte was generated by mixing the disiloxanes with 1 g of 13X zeolite (Union Showa K. K. Zeolite) in a glove box. The mixture was left in the glove box for about 24 hours before the mixture was filtered to separate the zeolite from the disiloxane. LiBOB was then dissolved to 1.0 M in the disiloxane. The result was used as the second electrolyte.

A third electrolyte was generated by mixing the disiloxanes with 1 g of 13X zeolite (Union Showa K. K. Zeolite) in a glove box. The mixture was left in the glove box for about 24 hours before the mixture was filtered to separate the zeolite from the disiloxane. $LiPF_6$ was dissolved to 1.0 M in the disiloxane. The result was mixed with 1 g of 13X zeolite (Union Showa K. K. Zeolite) in a glove box. The mixture was again left in the glove box for about 24 hours before the mixture was filtered to separate the zeolite from the disiloxane. The result was used as the third electrolyte.

Figure 3:
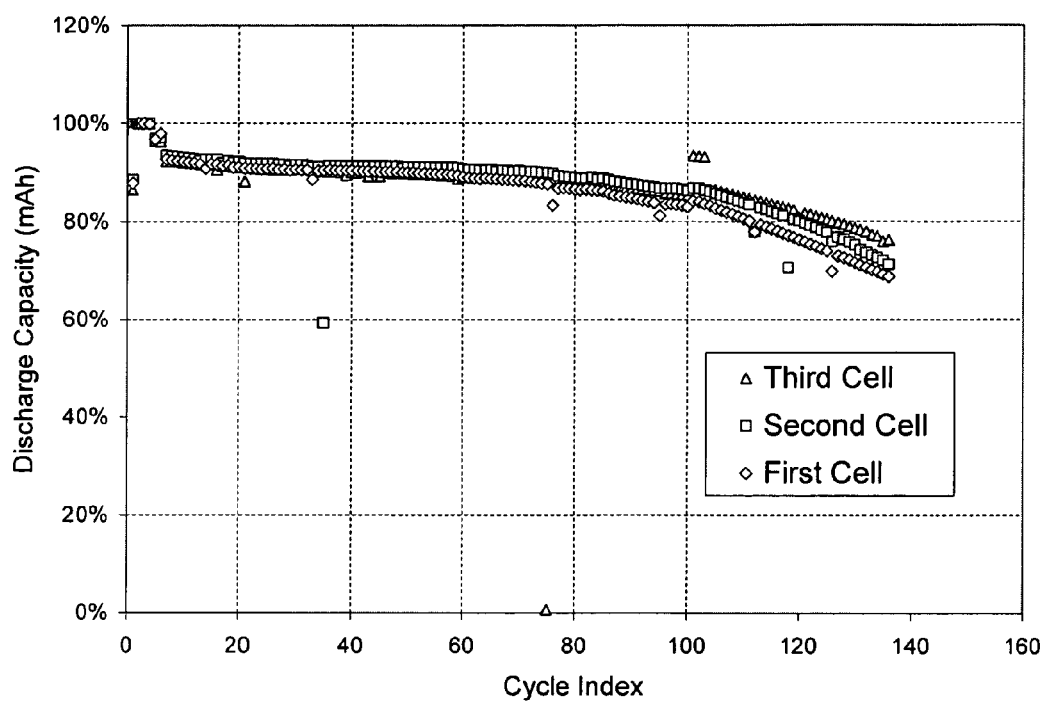
FIG. 3 compares the discharge capacity retention for batteries having electrolytes that are treated with zeolites against batteries having electrolytes that are not treated with zeolites.

A first button cell was generated with the first electrolyte, one of the anodes, one of the cathodes. A second button cell was generated with the first electrolyte, one of the anodes, one of the cathodes. A third button cell was generated with the first electrolyte, one of the anodes, one of the cathodes. The button cells were each repeatedly charged and discharged between 2.7 V and 4.0 V. During formation of a passive layer in the first four cycles, the cells were charged using constant current at a rate of C/20 followed by charging at constant voltage until the current falls to C/100. During the same four cycles, the cells were discharged at C/20. During the subsequent cycles, the cells were charged using constant current at a rate of C/5 followed by charging at constant voltage until the current falls to C/100 and were discharged at C/5. The tests were carried out at 37° C. The results are displayed in FIG. 3. The zeolite treatment appears to have improved the performance of the second cell relative to the first cell. Additionally, the zeolite treatment of the disiloxanes after the addition of the salt may have improved the performance of the third cell relative to the second cell.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of preparing a battery, comprising:
   contacting one or more components with a zeolite, the one or more components being selected from a group consisting of silanes, polysiloxanes, tetrasiloxanes, trisiloxanes, and disiloxanes;
   separating the one or more components from the zeolite;
   combining the one or more components with one or more second components so as to form an electrolyte for the battery, the electrolyte being formed after separating the one or more components from the zeolite; and
   activating one or more anodes and one or more cathodes with the electrolyte.

2. The method of claim 1, wherein the one or more second components includes one or more organic solvents.

3. The method of claim 2, wherein the organic solvent is selected from the group consisting of:
   propylene carbonate (PC), ethylene carbonate (EC), butylene carbonate (BC), vinylene carbonate (VC), dimethyl carbonate (DMC), diethyl carbonate (DEC), ethylmethyl carbonate (EMC), dipropyl carbonate (DPC), dialkyl carbonates, 1,2-dimethoxyethane (DME), methyl propyl carbonate, ethyl propyl carbonate, methyl formate, methyl acetate, ethyl propionate, gamma-butyrolactone, 1,2-ethoxyethane (DEE), ethoxymethoxyethane (EME), tetrahydrofuran and 2-methyltetrahydrofuran, dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, sulphorane, methylsulphorane, 1,3-diemthyl-2-imidazoline, 3-methyl-2-oxazolidinone, ethylether, 1,3-propanesultone, anisole, and N-methylpyrrolidone.

4. The method of claim 1, wherein the one or more second components includes one or more salts.

5. The method of claim 1, wherein the one or more second components includes one or more organoborate salts.

6. The method of claim 5, wherein the one or more organoborate salts include a dihalo mono[bidentate] borate.

7. The method of claim 6, wherein the organoborate salt includes one or more salts according to:

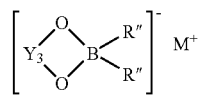

wherein $M^+$ is a metal ion selected from the Group I or Group II elements; $Y_3$ is selected from a group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$, or R'; Z' is alkyl, halogenated alkyl, —C=NR', CR'$_3$ or R'; R" is a halogen; R' is halogen or hydrogen; R is hydrogen, alkyl, halogenated alkyl, cyano, or halogen; a is 0 to 4 and b is 1 to 4.

8. The method of claim 6, wherein the one or more components include a disiloxane.

9. The method of claim 5, wherein the one or more organoborate salts include lithium difluoro oxalatoborate (LiDfOB).

10. The method of claim 5, wherein the one or more organoborate salts include a bis[bidentate] borate.

11. The method of claim 10, wherein the bis[bidentate] borate is represented by formula I-A:

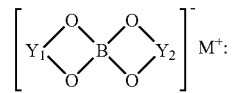

wherein $M^+$ is a metal ion selected from the Group I or Group II elements; $Y_1$ and $Y_2$ are each selected from a group consisting of:
   —CX(CRR)$_a$CX—, —CZZ'(CRR)$_a$CZZ'—, —CX(CRR)$_a$CZZ'—, —SO$_2$(CRR)$_b$SO$_2$—, and —CO(CRR)$_b$SO$_2$—; X is =O or =NR', Z is alkyl, halogenated alkyl, —C=NR', CR'$_3$ or R'; Z' is alkyl, halogenated alkyl, —C=NR', CR'$_3$ or R'; R' is halogen or hydrogen; R is hydrogen, alkyl, halogenated alkyl, cyano, or halogen; a is 0 to 4 and b is 1 to 4.

12. The method of claim 11, wherein the bis[bidentate] borate represented by formula I-A is lithium bis-oxalato borate (LiBOB).

13. The method of claim 1, wherein the one or more components include a silane.

14. The battery of claim 13, wherein the silane includes a silicon linked to one or more substituents that each include a poly(alkylene oxide) moiety or a cyclic carbonate moiety.

15. The method of claim 14, wherein the silane is represented by SiR$_{4-x-y}$R'$_x$R"$_y$; wherein R is an alkyl group, an aryl group or a halogen, R'$_x$ is represented by Formula VIII-A or Formula VIII-C, R"$_y$ is represented by Formula VIII-B, x is 0 to 4, y is 0 to 4, 4-x-y indicates the number of R substituents, and x+y is at least 1;

Formula VIII-A:

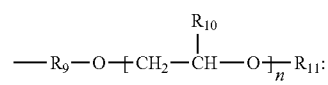

wherein $R_9$ is nil or an organic spacer; $R_{10}$ is hydrogen; alkyl or aryl; $R_{11}$ is alkyl or aryl; and n is 1 to 15;

Formula VIII-B:

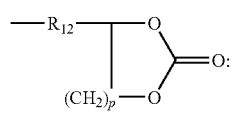

wherein $R_{12}$ is an organic spacer and p is 1 to 2; and

Formula VIII-C:

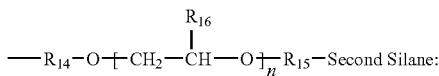—Second Silane:

where $R_{14}$ is nil or a spacer; $R_{15}$ is nil or a spacer; $R_{16}$ is hydrogen, alkyl or aryl; second silane represents another silane and n is 1 to 15.

16. The method of claim 15, wherein the silane represented by $SiR_{4-x-y}R'_xR''_y$
is represented by Formula VIII-D:

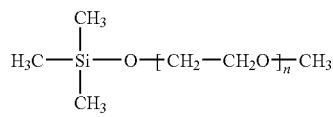

wherein n is 1 to 15.

17. The method of claim 16, wherein n is 3.

18. The method of claim 1, wherein the one or more components include one or more disiloxanes.

19. The method of claim 18, wherein at least one disiloxane includes a backbone with a silicon linked to one or more substituents that each include a poly(alkylene oxide) moiety or a cyclic carbonate moiety.

20. The method of claim 18, wherein at least one disiloxane is represented by:

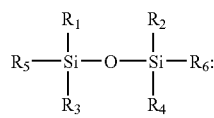

wherein $R_1$ is an alkyl group or an aryl group; $R_2$ is an alkyl group or an aryl group; $R_3$ is an alkyl group or an aryl group; $R_4$ is an alkyl group or an aryl group; $R_5$ is represented by Formula VII-A, Formula VII-B or Formula VII-C; $R_6$ is an alkyl group, an aryl group, represented by Formula VII-D, or represented by Formula VII-E;

Formula VII-A:

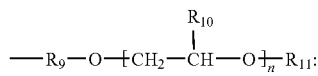

wherein $R_9$ is nil or a spacer; $R_{10}$ is hydrogen; alkyl or aryl; $R_{11}$ is alkyl or aryl; and n is 1 to 12;

Formula VII-B:

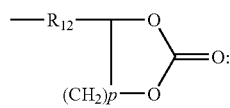

wherein $R_{12}$ is an organic spacer and p is 1 to 2;

Formula VII-C:

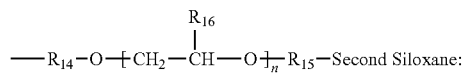—Second Siloxane:

where $R_{14}$ is nil or a spacer, $R_{15}$ is nil or a spacer; $R_{16}$ is hydrogen, alkyl or aryl; second siloxane represents another siloxane and n is 1 to 12;

Formula VII-D:

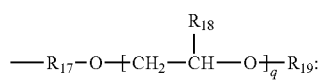

wherein $R_{17}$ is nil or a spacer; $R_{18}$ is hydrogen; alkyl or aryl; $R_{19}$ is alkyl or aryl; and q is 1 to 12; and Formula VII-E:

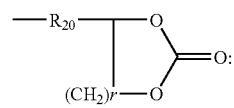

wherein $R_{20}$ is an organic spacer and p is 1 to 2.

21. The method of claim 1, wherein the one or more components include one or more trisiloxanes.

22. The method of claim 21, wherein at least one trisiloxane includes a backbone with three silicons, one or more of the silicons being linked to one or more substituents that each include a poly(alkylene oxide) moiety or a cyclic carbonate moiety.

23. The method of claim 21, wherein at least one trisiloxane is represented by:

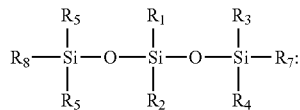

wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is represented by Formula V-A or Formula V-B; $R_8$ is represented by Formula V-C or Formula V-D;

Formula V-A:

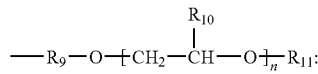

wherein $R_9$ is nil or a spacer; $R_{10}$ is hydrogen; alkyl or aryl; $R_{11}$ is alkyl or aryl; and n is 1 to 12;

Formula V-B:

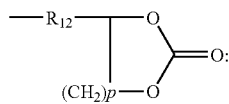

wherein $R_{12}$ is an organic spacer and p is 1 to 2;
Formula V-C:

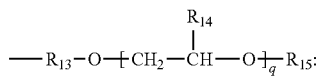

wherein $R_{13}$ is nil or a spacer; $R_{14}$ is hydrogen; alkyl or aryl; $R_{15}$ is alkyl or aryl; and q is 1 to 12; and
Formula V-D:

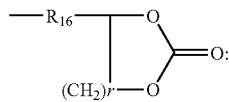

wherein $R_{16}$ is an organic spacer and p is 1 to 2.

24. The method of claim 21, wherein at least one trisiloxane is represented by:

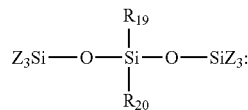

wherein $R_{19}$ is an alkyl group or an aryl group; $R_{20}$ is represented by Formula VI-A, Formula VI-B or Formula VI-C;
Formula VI-A:

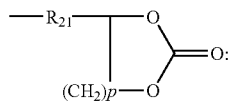

wherein $R_{21}$ is an organic spacer and p is 1 to 2;
Formula VI-B:

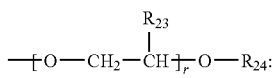

wherein $R_{23}$ is hydrogen; alkyl or aryl; $R_{24}$ is alkyl or aryl; and r is 1 to 12; and
Formula VI-C:

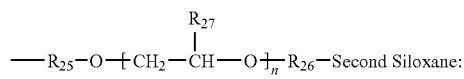

where $R_{25}$ is nil or a spacer; $R_{26}$ is nil or a spacer; $R_{27}$ is hydrogen, alkyl or aryl; second siloxane represents another siloxane and n is 1 to 12.

25. The method of claim 1, wherein the one or more components include one or more tetrasiloxanes.

26. The method of claim 25, wherein at least one tetrasiloxane includes a backbone with four silicons, one or more of the silicons being linked to one or more substituents that each include a poly(alkylene oxide) moiety or a cyclic carbonate moiety.

27. The method of claim 1, wherein the once or more components include one or more polysiloxanes.

28. The method of claim 27, wherein at least one polysiloxane includes a backbone with five or more silicons, one or more of the silicons being linked to one or more substituents that each include a poly(alkylene oxide) moiety or a cyclic carbonate moiety.

29. The method of claim 1, wherein the one or more second components include an additive.

30. The method of claim 29, wherein the one or more additives is selected from a group consisting of o-phenylene carbonate, vinyl carbonate (VC), vinyl ethylene carbonate (VEC), ethylene sulfite (ES), propylene sulfite (PS), 1,3 dimethyl butadiene, styrene carbonate, an aromatic carbonate, vinyl pyrrole, vinyl piperazine, vinyl piperidine, and vinyl pyridine.

31. The method of claim 30, wherein the one or more of the additives is selected from a group consisting of vinyl carbonate (VC), vinyl ethylene carbonate (VEC), ethylene sulfite (ES), propylene sulfite (PS).

32. The method of claim 31, wherein the one or more of the additives is selected from a group consisting of vinyl carbonate (VC), and vinyl ethylene carbonate (VEC).

33. The method of claim 32, wherein the one or more of the additives is vinyl ethylene carbonate (VEC).

34. The method of claim 1, wherein the zeolite includes a molecular sieve.

35. The method of claim 1, wherein the electrolyte excludes the zeolyte at the time of activating the one or more anode and the one or more cathodes with the electrolyte.

36. The method of claim 1, wherein zeolyte is present in the one or more anodes and/or the and the one or more cathodes.

37. The method of claim 1, wherein the battery includes a separator and zeolite is present in the separator.

* * * * *